US011909147B2

(12) United States Patent
Morgan et al.

(10) Patent No.: US 11,909,147 B2
(45) Date of Patent: Feb. 20, 2024

(54) CABLE CONNECTOR ASSEMBLY

(71) Applicant: TE Connectivity Services GmbH, Schaffhausen (CH)

(72) Inventors: Chad William Morgan, Carneys Point, NJ (US); John Joseph Consoli, Harrisburg, PA (US)

(73) Assignee: TE CONNECTIVITY SOLUTIONS GMBH, Scahffhausen (CH)

( * ) Notice: Subject to any disclaimer, the term of this patent is extended or adjusted under 35 U.S.C. 154(b) by 38 days.

(21) Appl. No.: 17/646,938

(22) Filed: Jan. 4, 2022

(65) Prior Publication Data

US 2023/0216254 A1 Jul. 6, 2023

(51) Int. Cl.
*H01R 24/20* (2011.01)
*H01R 24/28* (2011.01)

(52) U.S. Cl.
CPC ............. *H01R 24/20* (2013.01); *H01R 24/28* (2013.01)

(58) Field of Classification Search
CPC ........ H01R 24/20; H01R 24/28; H01R 24/22; H01R 24/30; H01R 24/40; H01R 24/50; H01R 24/52; H01R 24/542; H01R 24/547; H01R 24/70
See application file for complete search history.

(56) References Cited

U.S. PATENT DOCUMENTS 6,843,657 B2 1/2005 Driscoll et al.
7,094,103 B2 * 8/2006 Lai ..................... H01R 13/6597 439/607.45
7,404,718 B2 7/2008 Tutt et al.
8,113,860 B2 2/2012 Sandwith
8,888,533 B2 * 11/2014 Westman ........... H01R 13/6586 439/626
10,699,823 B2 * 6/2020 Blackburn ............... H04B 3/30
10,714,237 B1 * 7/2020 Hamner ................. H01R 24/56
10,873,160 B2 * 12/2020 Henry .................... H01R 12/72
10,938,139 B2 3/2021 Rossman et al.
11,211,743 B2 * 12/2021 Briant ................ H01R 13/6591
11,381,038 B1 * 7/2022 Patel ................ H01R 13/65914
11,489,293 B2 * 11/2022 Balakrishnan ....... H01R 12/721
2010/0112849 A1 * 5/2010 Malstrom .......... H01R 13/6271 439/445
2014/0051295 A1 * 2/2014 Westman ............ H01R 13/518 439/626
2017/0018881 A1 * 1/2017 Patel .................. H01R 13/6616
2017/0077643 A1 * 3/2017 Zbinden ............... G02B 6/4268
2017/0170540 A1 * 6/2017 Morgan .................... H01P 3/16
2020/0005966 A1 * 1/2020 Blackburn ........... H01B 11/002
2022/0271478 A1 * 8/2022 Streckewald .... H01R 13/65914

* cited by examiner

*Primary Examiner* — Harshad C Patel

(57) ABSTRACT

A cable connector assembly includes a contact holder holding first and second contacts in contact channels terminated to ends of conductors of a cable. The contacts have mating ends forward of the front of the contact holder. The cable connector assembly includes a contact shield coupled to the contact holder having a base and a shroud. The base surrounds a base chamber that receives an end of the cable and the contact holder and provides electrical shielding at first and second interfaces. The shroud surrounds a shroud chamber that receives the mating ends of the first and second contacts to provide electrical shielding along the mating ends of the first and second contacts.

22 Claims, 14 Drawing Sheets

CABLE CONNECTOR ASSEMBLY

BACKGROUND OF THE INVENTION

The subject matter herein relates generally to communication systems.

Communication systems use electrical connectors to electrically connect various components to allow data communication between the components. For example, in a backplane system, circuit board assemblies having electrical connectors mounted to circuit boards are mated to electrically connect the circuit boards. The system typically needs to absorb large dimensional mating tolerance, such as when the circuit boards are inserted into an equipment rack. The contacts of the electrical connectors at the mating zone are sized to accommodate the mating tolerance distances. The excess lengths of the contacts typically create an electrical stub. In high speed connectors, the stubs can significantly degrade the signal integrity performance of the connector. Electrical shielding is provided to improve signal integrity. However, proper locating of the shielding within the electrical connector is difficult. Additionally, breaks or gaps in the shielding negativily affect the shielding effectiveness.

A need remains for electrical connectors of a communication system having improved mating and shielding for improved signal integrity performance.

BRIEF DESCRIPTION OF THE INVENTION

In one embodiment, a cable connector assembly is provided and includes a cable having an insulator holding a first conductor and a second conductor. The cable has a cable shield surrounding the first and second conductors along a length of the cable. The cable connector assembly includes a contact holder including a first contact channel and a second contact channel. The contact holder extends between a front and a rear. The cable is coupled to the rear of the contact holder. The cable connector assembly includes a first contact received in the first contact channel. The first contact is terminated to an end of the first conductor at a first interface. The first contact has a mating end forward of the front of the contact holder. The cable connector assembly includes a second contact received in the second contact channel. The second contact is terminated to an end of the second conductor at a second interface. The second contact has a mating end forward of the front of the contact holder. The cable connector assembly includes a contact shield coupled to the contact holder. The contact shield includes a base and a shroud forward of the base. The base surrounds a base chamber that receives an end of the cable and the contact holder. The base surrounds the first and second contacts and the first and second conductors to provide electrical shielding at the first and second interfaces. The base is electrically connected to the cable shield. The shroud surrounds a shroud chamber that receives the mating ends of the first and second contacts to provide electrical shielding along the mating ends of the first and second contacts.

Optionally, shielding is provided substantially around the pair of signal conductors, such as on all four sides of the pair of signal conductors.

In another embodiment, a cable connector assembly is provided and includes a connector housing having a mating end and a cable end. The connector housing includes cable cavities extending between the mating end and the cable end. The cable connector assembly includes a plurality of cable assemblies received in corresponding cable cavities and coupled to the connector housing. Each cable assembly includes a cable and a contact assembly coupled to an end of the cable. The cable extends from the cable end of the connector housing. The cable has an insulator holding a first conductor and a second conductor. The cable has a cable shield surrounding the first and second conductors along a length of the cable. The contact assembly includes a contact holder holding a first contact and a second contact. The contact assembly includes a contact shield providing electrical shielding for the first and second contacts. The cable connector assembly includes the contact holder including a first contact channel and a second contact channel. The contact holder extends between a front and a rear. The cable is coupled to the rear of the contact holder. The first contact is received in the first contact channel. The first contact is terminated to an end of the first conductor at a first interface. The first contact has a mating end forward of the front of the contact holder. The second is contact received in the second contact channel. The second contact is terminated to an end of the second conductor at a second interface. The second contact has a mating end forward of the front of the contact holder. The contact shield is coupled to the contact holder. The contact shield includes a base and a shroud forward of the base. The base is located in the corresponding cable cavity. The shroud is located at least one of at or forward of the mating end of the connector housing. The base surrounds a base chamber that receives an end of the cable and the contact holder. The base surrounds the first and second contacts and the first and second conductors to provide electrical shielding at the first and second interfaces. The base is electrically connected to the cable shield. The shroud surrounds a shroud chamber that receives the mating ends of the first and second contacts to provide electrical shielding along the mating ends of the first and second contacts.

Optionally, shielding is provided substantially around the pair of signal conductors, such as on all four sides of the pair of signal conductors.

In a further embodiment, a communication system is provided and includes a first cable connector assembly including a first connector housing having first cable cavities extending between a mating end and a cable end. The first cable connector assembly includes a plurality of first cable assemblies received in corresponding first cable cavities and coupled to the first connector housing. Each first cable assembly includes a first cable and a first contact assembly coupled to an end of the first cable. The first cable has an insulator holding a first conductor and a second conductor. The first cable has a first cable shield. The first contact assembly includes a first contact holder holding a first contact and a second contact. The first contact assembly includes a first contact shield providing electrical shielding for the first and second contacts. The first contact shield providing 360° shielding for the first and second contacts along a length of the first and second contacts. The first contact shield electrically coupled to the first cable shield and providing 360° shielding for a length of the first cable shield. The communication system includes a second cable connector assembly including a second connector housing having second cable cavities extending between a mating end and a cable end. The second cable connector assembly includes a plurality of second cable assemblies received in corresponding second cable cavities and coupled to the second connector housing. Each second cable assembly includes a second cable and a second contact assembly coupled to an end of the second cable. The second cable has an insulator holding a third conductor and a fourth conductor. The second cable has a second cable shield. The second contact assembly includes a second contact holder holding a third contact and a fourth contact. The third contact is configured to be electrically connected to the first contact. The fourth contact is configured to be electrically connected to the second contact. The second contact assembly includes a second contact shield providing electrical shielding for the third and fourth contacts. The second contact shield providing 360° shielding for the third and fourth contacts along a length of the third and fourth contacts. The second contact shield electrically coupled to the second cable shield and providing 360° shielding for a length of the second cable shield. The second contact shield configured to be electrically connected to the first contact shield.

DETAILED DESCRIPTION OF THE INVENTION

Figure 1:
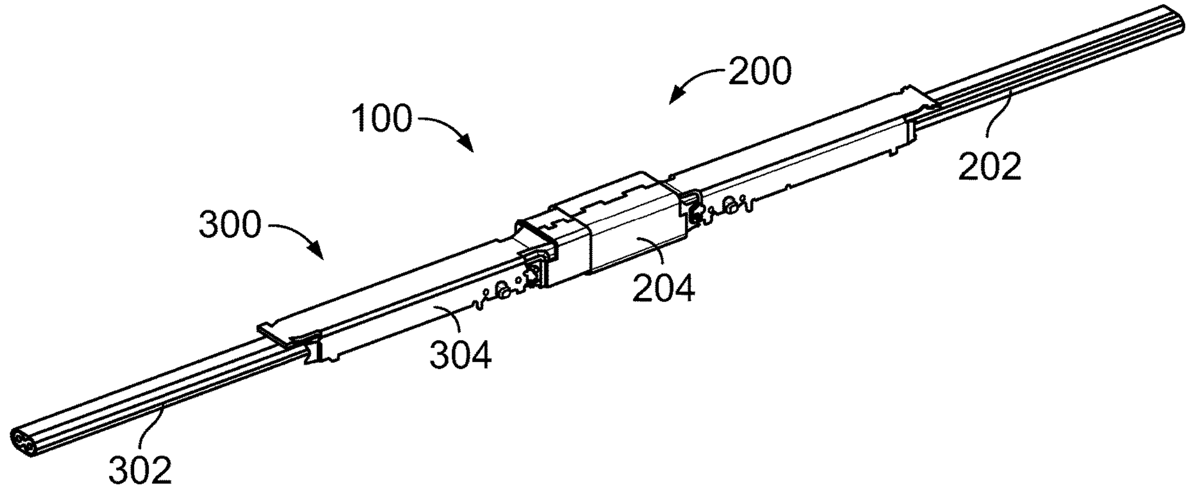
FIG. 1 is a schematic view of a communication system in accordance with an exemplary embodiment.

FIG. 1 is a schematic view of a communication system 100 in accordance with an exemplary embodiment. The communication system 100 includes a first cable connector assembly 200 and a second cable connector assembly 300 electrically coupled together. In various embodiments, the first and second cable connector assemblies 200, 300 are directly coupled together. In other various embodiments, a jumper module or an adapter module may be provided between the first and second cable connector assemblies 200, 300. In various embodiments, the communication system 100 may include multiple first cable connector assemblies 200 held together, such as in a common housing, forming a first electrical connector and the communication system 100 may include multiple second cable connector assemblies 300 held together, such as in a common housing, forming a second electrical connector.

In an exemplary embodiment, the first cable connector assembly 200 includes a pair of signal transmission lines and the second cable connector assembly 300 includes a pair of signal transmission lines. For example, the first and second cable connector assemblies 200, 300 may include cables 202, 302, respectively. The cables 202, 302 may be twin-axial cables in various embodiments. The pair of signal transmission lines may form a differential pair. In an exemplary embodiment, the first and second cable connector assemblies 200, 300 include shield structures 204, 304, respectively, that provide electrical shielding along the lengths of the signal transmission lines. The shield structures 204, 304 provide 360° shielding for the pair of signal transmission lines. For example, the shield structures 204, 304 may be box-shaped covering the top, bottom, right side, and left side of the corresponding cables 202, 302 and mating contacts of the first and second cable connector assemblies 200, 300. In an exemplary embodiment, the shield structures 204, 304 are stamped and formed shield structures that may be manufactured in a cost effective and reliable manner. The shield structures 204, 304 may have uniform thicknesses, such as being stamped from a metal sheet or blank and then being formed into a predetermined shape.

Figure 2:
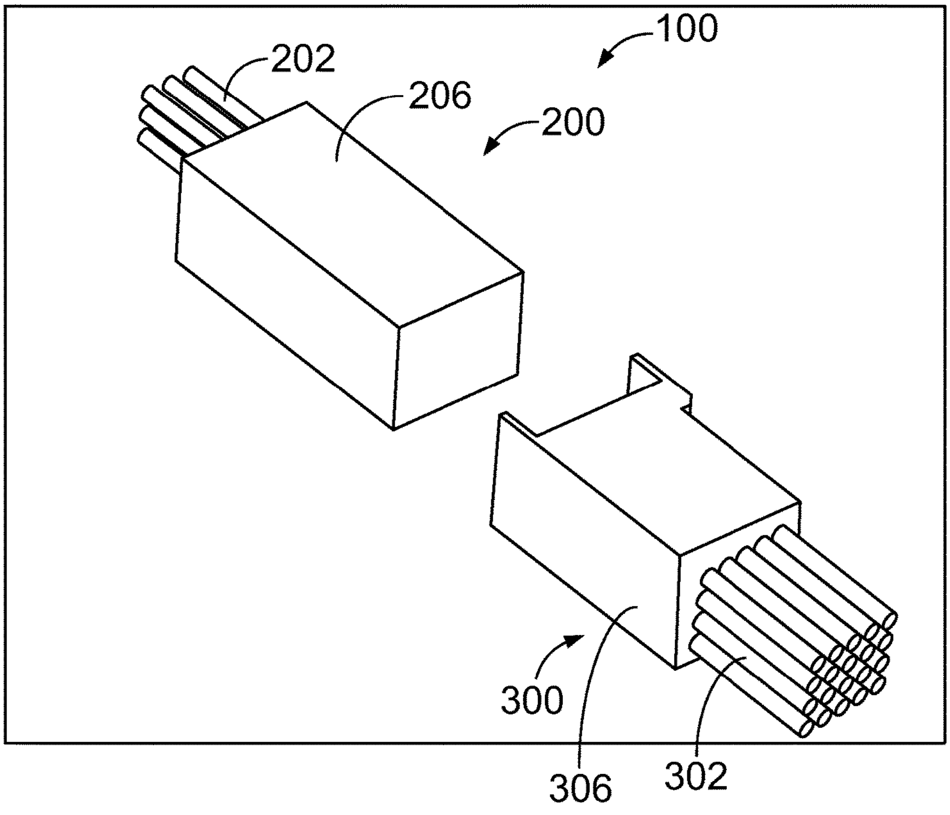
FIG. 2 is a schematic view of the communication system in accordance with an exemplary embodiment.

FIG. 2 is a schematic view of the communication system 100 in accordance with an exemplary embodiment. The communication system 100 includes the first cable connector assembly 200 and the second cable connector assembly 300 electrically coupled together. In the illustrated embodiment, the first cable connector assembly 200 includes a plurality of the cables 202 and the second cable connector assembly 300 includes a plurality of the cables 302. The first cables 202 are held together in a first connector housing 206 and the second cables 302 are held together in a second connector housing 306. The cables 202, 302 may be arranged in a matrix or array of rows and columns.

Figure 3:
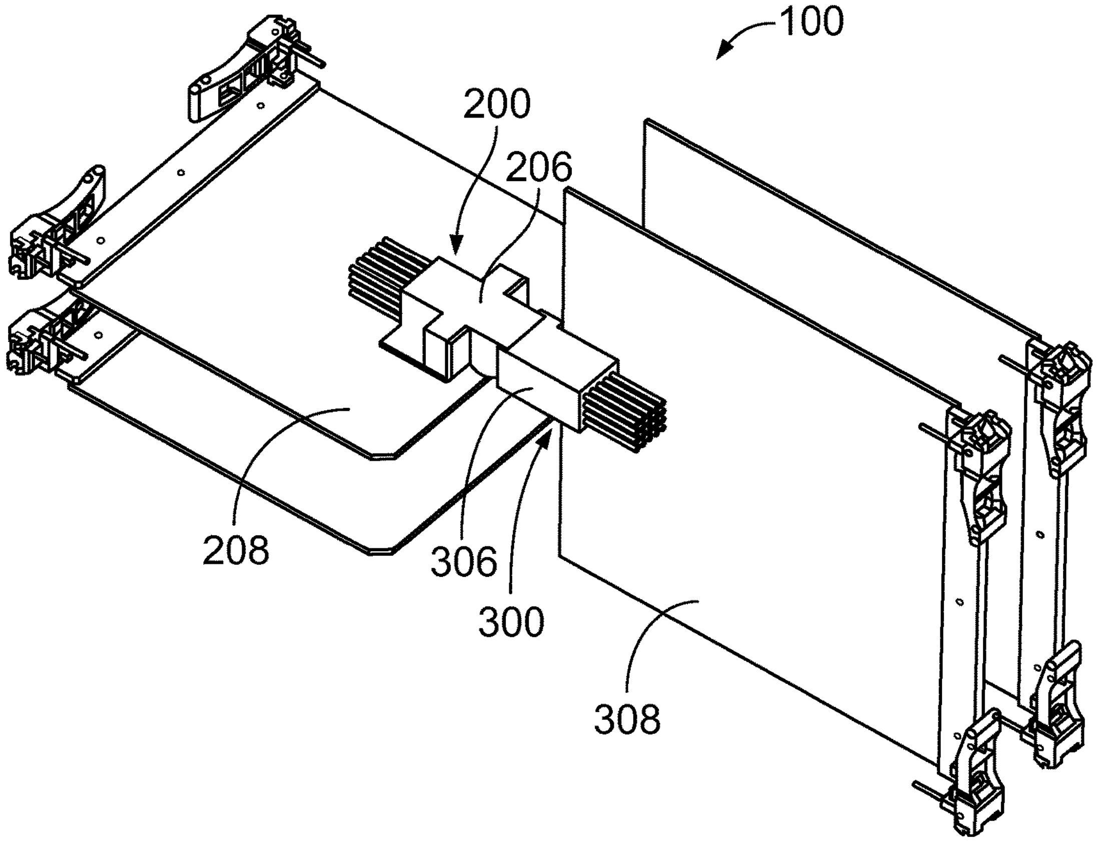
FIG. 3 is a schematic view of the communication system in accordance with an exemplary embodiment.

FIG. 3 is a schematic view of the communication system 100 in accordance with an exemplary embodiment. The communication system 100 includes the first cable connector assembly 200 and the second cable connector assembly 300 electrically coupled together. In an exemplary embodiment, the first and second cable connector assemblies 200, 300 are circuit board assemblies coupled to first and second circuit boards 208, 308, respectively. The first connector housing 206 may be coupled to the first circuit board 208 and the second connector housing 306 may be coupled to the second circuit board 308. In various embodiments, the communication system 100 may be a server or network switch, such as a backplane system or a daughtercard/motherboard system. In an exemplary embodiment, the communication system 100 may include an equipment rack used to hold the first cable connector assembly 200 and/or the second cable connector assembly 300. The first and second circuit boards 208, 308 may be oriented parallel to each other or orthogonal to each other, as in the illustrated embodiment.

Figure 4:
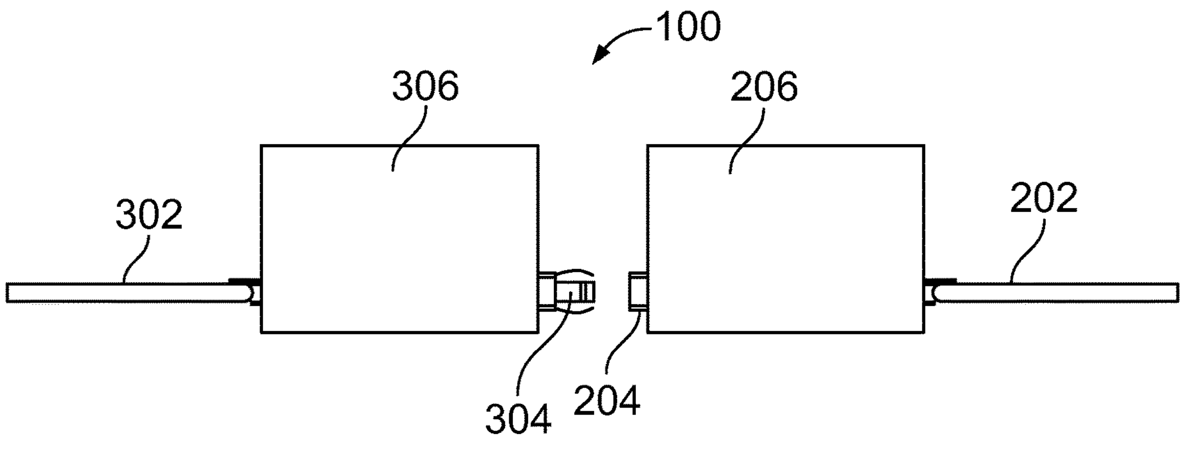
FIG. 4 is a side view of the communication system in accordance with an exemplary embodiment.

FIG. 4 is a side view of the communication system 100 in accordance with an exemplary embodiment. In an exemplary embodiment, the communication system 100 includes one or more of the cables 202 coupled to the first connector housing 206 and the second cable connector assembly 300 includes one or more of the cables 302 coupled to the second connector housing 306. The first electrical connector is configured to be coupled to the second electrical connector along a mating axis. The signal contacts (not shown) are electrically connected when fully mated. The shield structures 204, 304 are electrically connected when fully mated to provide 360° shielding for the signal contacts and the signal conductors of the cables 202, 302 along lengths thereof. In an exemplary embodiment, the signal contacts may be pins and sockets; however other types of signal contacts may be provided in alternative embodiments. In an exemplary embodiment, the shield structure 204 is a female structure, such as a receptacle, and the shield structure 304 is a male structure, such as a plug.

Figure 5:
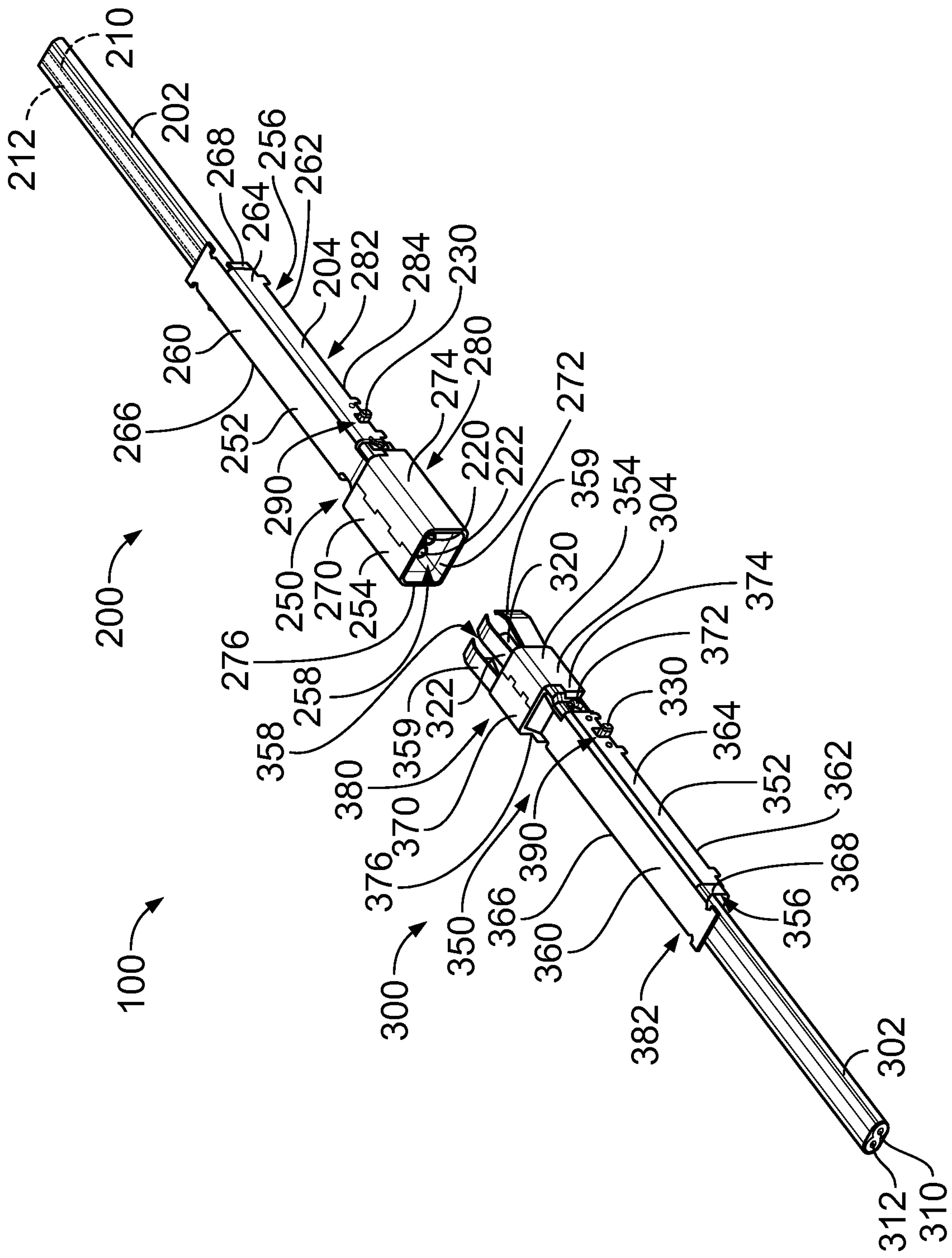
FIG. 5 is a perspective view of a portion of the communication system in accordance with an exemplary embodiment showing the first cable connector assembly and the second cable connector assembly in an unmated position.
Figure 6:
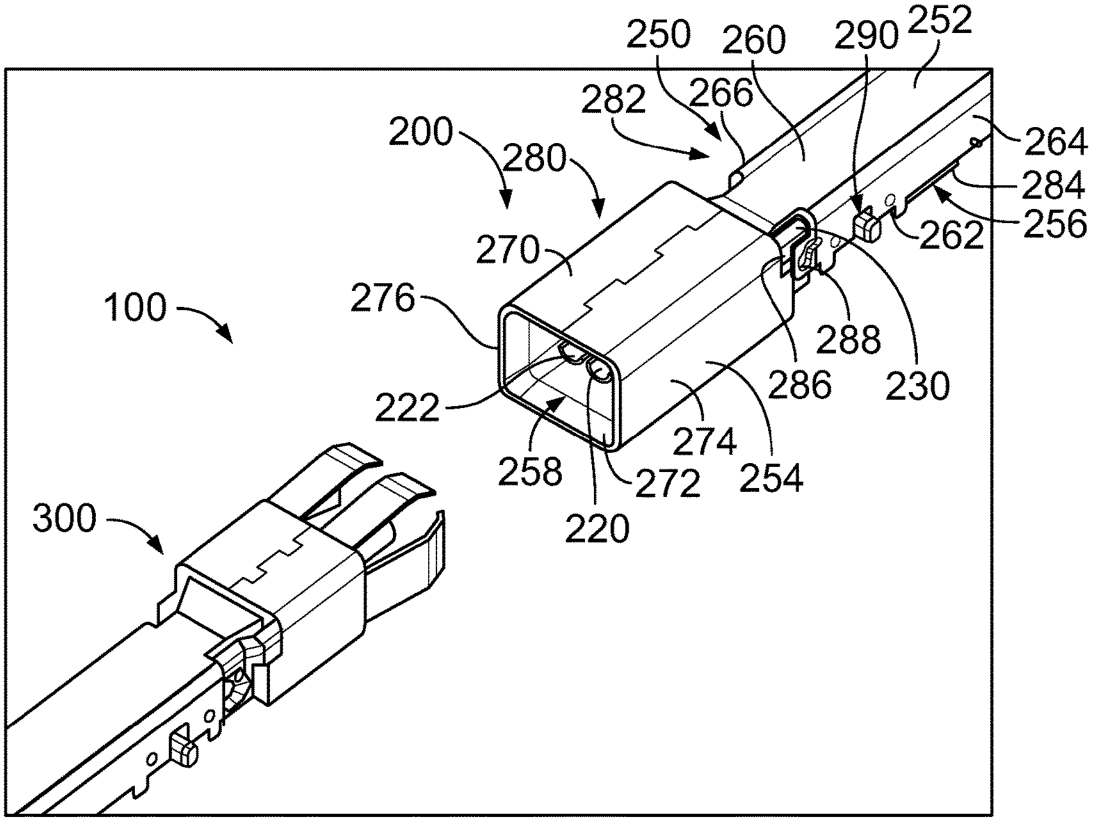
FIG. 6 is an enlarged view of a portion of the communication system in accordance with an exemplary embodiment showing the mating interface of the first cable connector assembly.
Figure 7:
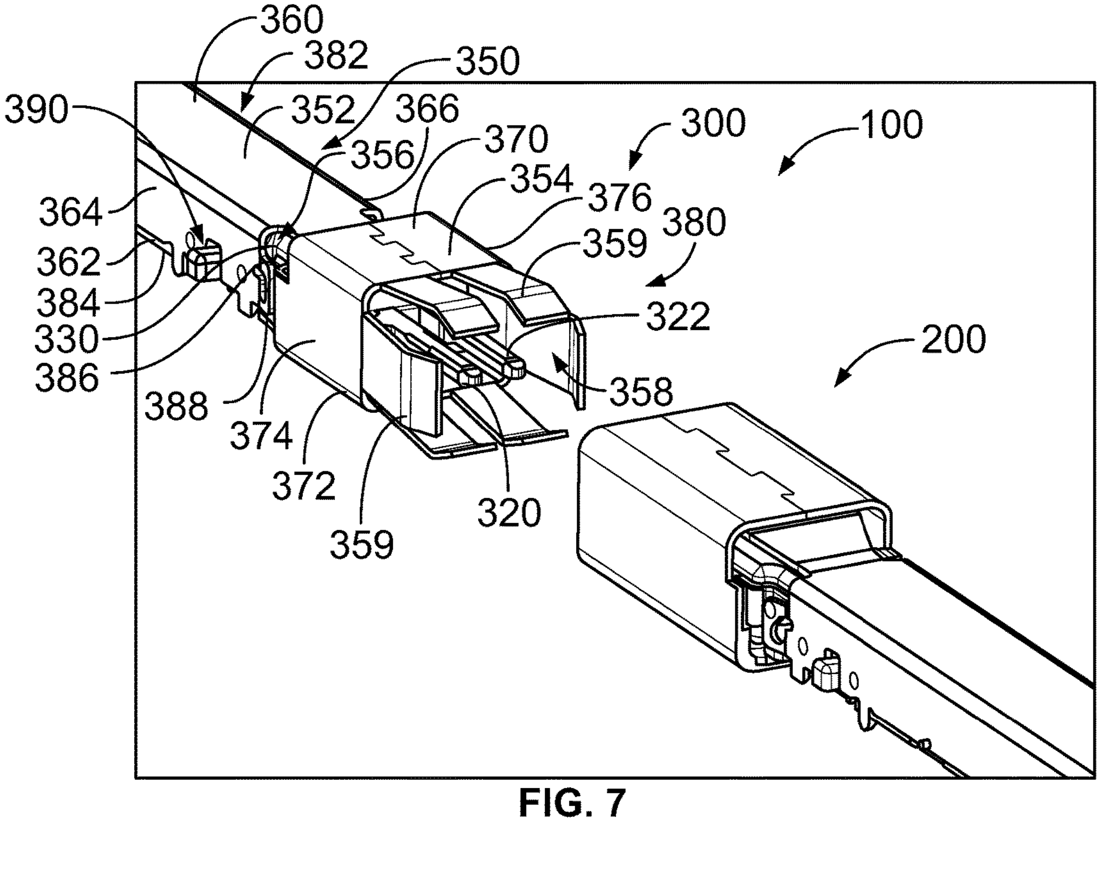
FIG. 7 is an enlarged view of a portion of the communication system in accordance with an exemplary embodiment showing the mating interface of the second cable connector assembly.

FIG. 5 is a perspective view of a portion of the communication system 100 in accordance with an exemplary embodiment showing the first cable connector assembly 200 and the second cable connector assembly 300 in an unmated position. FIG. 6 is an enlarged view of a portion of the communication system 100 in accordance with an exemplary embodiment showing the mating interface of the first cable connector assembly 200. FIG. 7 is an enlarged view of a portion of the communication system 100 in accordance with an exemplary embodiment showing the mating interface of the second cable connector assembly 300.

The first cable connector assembly 200 includes the first cable 202. The first cable 202 includes a first conductor 210 and a second conductor 212 (both shown in phantom in FIG. 5). In an exemplary embodiment, the cable 202 is a twin-axial cable having both conductors 210, 212 extending along parallel paths through the cable 202.

The first cable connector assembly 200 includes a first contact 220 and a second contact 222 held in a contact holder 230. The first contact 220 is terminated to the first conductor 210. The second contact 222 is terminated to the second conductor 212. The shield structure 204 of the first cable connector assembly 200 includes a contact shield 250 providing electrical shielding for the first and second contacts 220, 222. The contact shield 250 includes a base 252 and a shroud 254 forward of the base 252. The base 252 surrounds a base chamber 256 that receives an end of the cable 202 and the contact holder 230. The base 252 surrounds the first and second contacts 220, 222 and the first and second conductors 210, 212 to provide electrical shielding at the interfaces between the contacts 220, 222 and the conductors 210, 212. In an exemplary embodiment, the base 252 is electrically connected to the cable 202. The shroud 254 surrounds a shroud chamber 258 that receives mating ends of the first and second contacts 220, 222 to provide electrical shielding along the mating ends of the first and second contacts 220, 222. The shroud chamber 258 defines a receptacle configured to receive a mating end of the second cable connector assembly 300.

In an exemplary embodiment, the contact shield 250 is box-shaped. The contact shield 250 has a rectangular cross-section along the longitudinal axis in the illustrated embodiment. In an exemplary embodiment, the base 252 includes a base top wall 260, a base bottom wall 262, a base first side wall 264, and a base second side wall 266 forming the base chamber 256. The walls surround the base chamber 256 on all four sides. The walls may be continuous to completely surround the base chamber 256 (for example, provide 360° shielding). In an exemplary embodiment, the base 252 includes grounding tabs 268 bent inward toward the cable 202. The grounding tabs 268 engage the cable shield of the cable 202 to electrically connect the contact shield 250 to the cable shield. In an exemplary embodiment, the shroud 254 includes a shroud top wall 270, a shroud bottom wall 272, a shroud first side wall 274, and a shroud second side wall 276 forming the shroud chamber 258. The walls surround the shroud chamber 258 on all four sides. The walls may be continuous to completely surround the shroud chamber 258 (for example, provide 360° shielding).

In an exemplary embodiment, the contact shield 250 is a multi-piece structure. For example, the contact shield 250 includes a forward portion 280 and a rearward portion 282 separate and discrete from the forward portion. The forward portion 280 is stamped and formed to form at least a portion of the shroud 254. The rearward portion 282 is stamped and formed to form at least a portion of the base 252. In an exemplary embodiment, the forward portion 280 includes a tail 284. The forward portion 280 is coupled to the rearward portion 282 such that the tail 284 forms a portion of the base 252. In an exemplary embodiment, the forward portion 280 includes connecting tabs 286 engaging the rearward portion 282 to electrically connect the forward portion 280 to the rearward portion 282. The connecting tabs 286 may be provided along the top and/or the bottom and/or the sides of the contact shield 250. The rearward portion 282 includes connecting tabs 288 engaging the forward portion 280 to electrically connect the rearward portion 282 to the forward portion 280. The connecting tabs 288 may be provided along the top and/or the bottom and/or the sides of the contact shield 250. The connecting tabs 286 and/or 288 may be deflectable tabs configured to engage each other or other portions of the contact shield 250. In an exemplary embodiment, the forward portion 280 is plated with a plating layer. For example, the plating layer may be a silver plating or a gold plating to define a mating interface, such as for mating with the contact shield of the second cable connector assembly 300. In an exemplary embodiment, the rearward portion 282 is unplated, such as to reduce manufacturing costs.

In an exemplary embodiment, the contact shield 250 includes a shield locating feature 290 configured to interface with the contact holder 230 to axially position the contact shield 250 relative to the contact holder 230. For example, the shield locating feature 290 may be a cutout or pocket that receives a tab or other locating feature of the contact holder 230.

The second cable connector assembly 300 includes the second cable 302. The second cable 302 includes a first conductor 310 and a second conductor 312. In an exemplary embodiment, the cable 302 is a twin-axial cable having both conductors 310, 312 extending along parallel paths through the cable 302.

The second cable connector assembly 300 includes a first contact 320 and a second contact 322 held in a contact holder 330. The first contact 320 is configured to be coupled to the first contact 220 of the first cable connector assembly 200. The second contact 322 is configured to be coupled to the second contact 222 of the first cable connector assembly 200. The first contact 320 is terminated to the first conductor 310. The second contact 322 is terminated to the second conductor 312.

The shield structure 304 of the second cable connector assembly 300 includes a contact shield 350 providing electrical shielding for the first and second contacts 320, 322. The contact shield 350 is configured to be coupled to the contact shield 250 of the first cable connector assembly 200. The contact shield 350 includes a base 352 and a shroud 354 forward of the base 352. The base 352 surrounds a base chamber 356 that receives an end of the cable 302 and the contact holder 330. The base 352 surrounds the first and second contacts 320, 322 and the first and second conductors 310, 312 to provide electrical shielding at the interfaces between the contacts 320, 322 and the conductors 310, 312. In an exemplary embodiment, the base 352 is electrically connected to the cable 302. The shroud 354 surrounds a shroud chamber 358 that receives mating ends of the first and second contacts 320, 322 to provide electrical shielding along the mating ends of the first and second contacts 320, 322. In an exemplary embodiment, the shroud 354 includes grounding fingers 359 at the front of the shroud 254. The grounding fingers 359 are configured to be plugged into the receptacle defined by the shroud chamber 258 of the contact shield 250. The grounding fingers 359 extend along the mating ends of the first and second contacts 320, 322. The grounding fingers 359 provide electrical shielding for the contacts 320, 322.

In an exemplary embodiment, the contact shield 350 is box-shaped. The contact shield 350 has a rectangular cross-section along the longitudinal axis in the illustrated embodiment. In an exemplary embodiment, the base 352 includes a base top wall 360, a base bottom wall 362, a base first side wall 364, and a base second side wall 366 forming the base chamber 356. The walls surround the base chamber 356 on all four sides. The walls may be continuous to completely surround the base chamber 356 (for example, provide 360° shielding). In an exemplary embodiment, the base 352 includes grounding tabs 368 bent inward toward the cable 302. The grounding tabs 368 engage the cable shield of the cable 302 to electrically connect the contact shield 350 to the cable shield. In an exemplary embodiment, the shroud 354 includes a shroud top wall 370, a shroud bottom wall 372, a shroud first side wall 374, and a shroud second side wall 376 forming the shroud chamber 358. The walls surround the shroud chamber 358 on all four sides. The walls may be continuous to completely surround the shroud chamber 358 (for example, provide 360° shielding).

In an exemplary embodiment, the contact shield 350 is a multi-piece structure. For example, the contact shield 350 includes a forward portion 380 and a rearward portion 382 separate and discrete from the forward portion. The forward portion 380 is stamped and formed to form at least a portion of the shroud 354. The rearward portion 382 is stamped and formed to form at least a portion of the base 352. In an exemplary embodiment, the forward portion 380 includes a tail 384. The forward portion 380 is coupled to the rearward portion 382 such that the tail 384 forms a portion of the base 352. In an exemplary embodiment, the forward portion 380 includes connecting tabs 386 engaging the rearward portion 382 to electrically connect the forward portion 380 to the rearward portion 382. The connecting tabs 386 may be provided along the top and/or the bottom and/or the sides of the contact shield 350. The rearward portion 382 includes connecting tabs 388 engaging the forward portion 380 to electrically connect the rearward portion 382 to the forward portion 380. The connecting tabs 388 may be provided along the top and/or the bottom and/or the sides of the contact shield 350. The connecting tabs 386 and/or 388 may be deflectable tabs configured to engage each other or to engage other portions of the contact shield 350. In an exemplary embodiment, the forward portion 380 is plated with a plating layer. For example, the plating layer may be a silver plating or a gold plating to define a mating interface, such as for mating with the contact shield of the second cable connector assembly 300. In an exemplary embodiment, the rearward portion 382 is unplated, such as to reduce manufacturing costs.

In an exemplary embodiment, the contact shield 350 includes a shield locating feature 390 configured to interface with the contact holder 330 to axially position the contact shield 350 relative to the contact holder 330. For example, the shield locating feature 390 may be a cutout or pocket that receives a tab or other locating feature of the contact holder 330.

Figure 8:
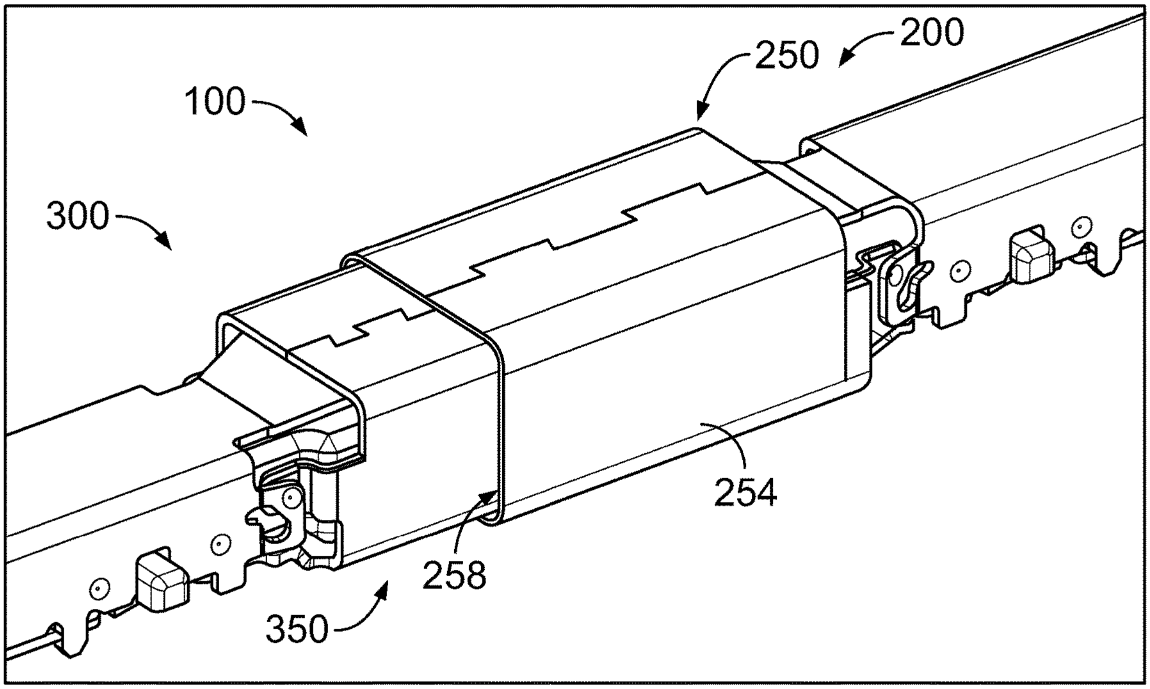
FIG. 8 is a perspective view of a portion of the communication system in accordance with an exemplary embodiment showing the first cable connector assembly mated with the second cable connector assembly.

FIG. 8 is a perspective view of a portion of the communication system 100 in accordance with an exemplary embodiment showing the first cable connector assembly 200 mated with the second cable connector assembly 300. When mated, the second contact shield 350 is plugged into the shroud chamber 258 of the shroud 254 of the first contact shield 250. The grounding fingers 359 (shown in FIG. 7) are loaded into the shroud chamber 258 and engage the interior surface of the shroud 254 to electrically connect the second contact shield 350 to the first contact shield 250. The shroud 254 of the first contact shield 250 forms a sleeve that surrounds the second contact shield 350. The first and second contact shields 250, 350 provide electrical shielding for the contacts along the mating interfaces thereof. The first and second contact shields 250, 350 provide 360° shielding around the mating interfaces of the contacts. Both pairs of the contacts are located in the shroud chamber 258 and surrounded by the contact shields 250, 350.

Figure 9:
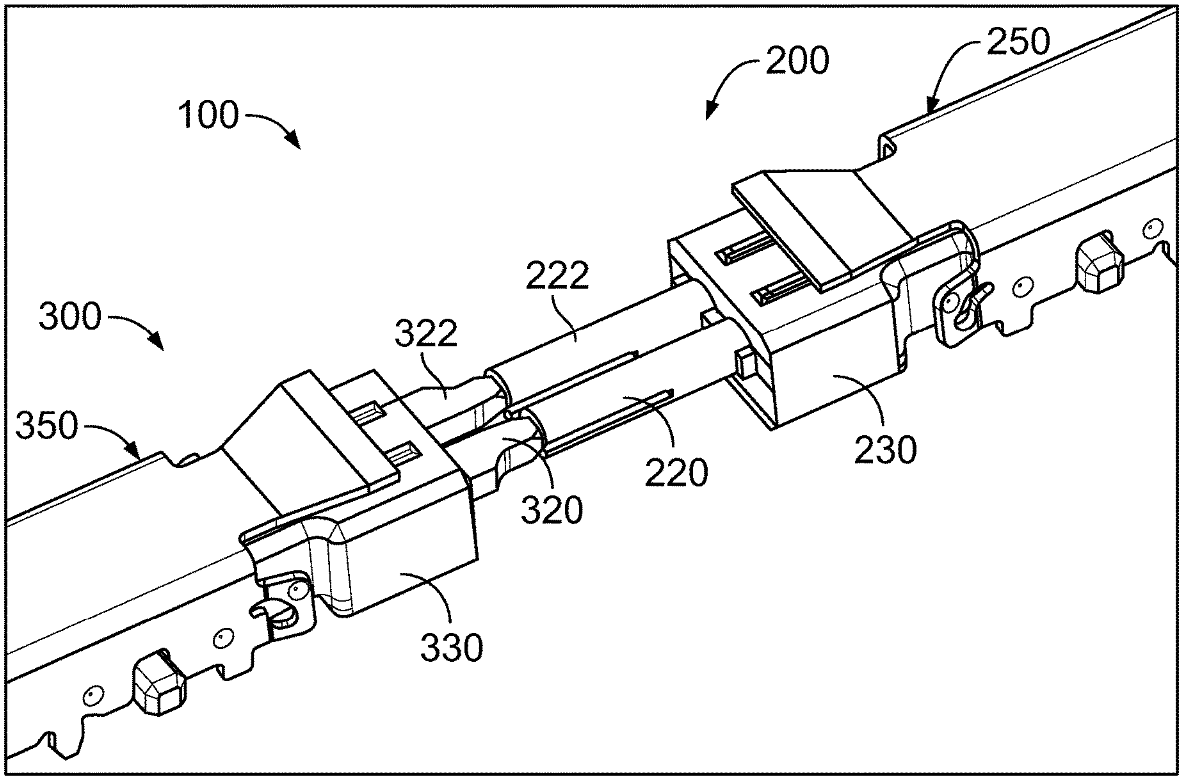
FIG. 9 is a perspective view of a portion of the communication system in accordance with an exemplary embodiment showing the first cable connector assembly mated with the second cable connector assembly.

FIG. 9 is a perspective view of a portion of the communication system 100 in accordance with an exemplary embodiment showing the first cable connector assembly 200 mated with the second cable connector assembly 300. Portions of the contact shields 250, 350 are removed to illustrate interior components of the cable connector assemblies 200, 300. FIG. 9 illustrates the contacts 220, 222 of the first cable connector assembly 200 mated with the contacts 320, 322 of the second cable connector assembly 300 at mating interfaces. In an exemplary embodiment, the contacts 220, 222 are cantilevered forward of the contact holder 230 and the contacts 320, 322 are cantilevered forward of the contact holder 230.

In the illustrated embodiment, the contacts 220, 222 are socket contacts and the contacts 320, 322 are pin contacts. The contacts 320, 322 are plugged into the contacts 220, 222. However, other types of contacts may be used in alternative embodiments, such as blade contacts, spring contacts, split beam contacts, or other types of contacts. In other alternative embodiments, the contact 220 may be a pin contact and the contact 222 may be a socket contact while the contact 320 may be a socket contact and the contact 322 may be a pin contact.

Figure 10:
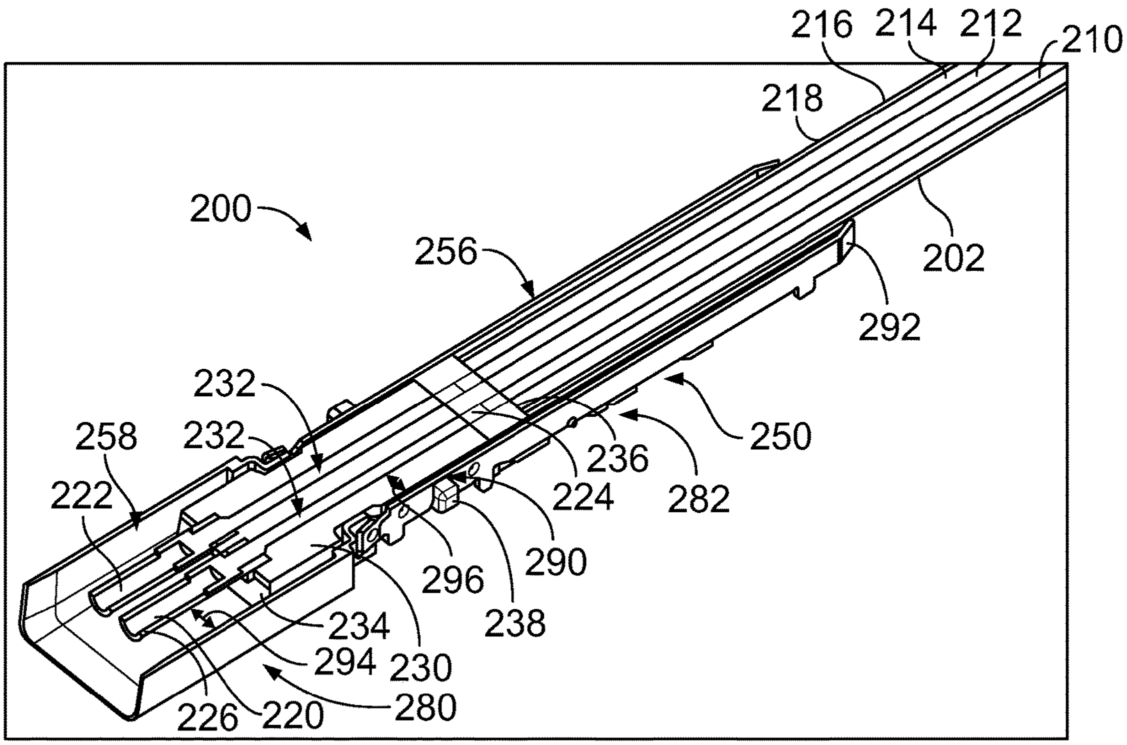
FIG. 10 is a cross-sectional view of the first cable connector assembly in accordance with an exemplary embodiment.

FIG. 10 is a cross-sectional view of the first cable connector assembly 200 in accordance with an exemplary embodiment. The cable connector assembly 200 includes the first cable 202, the first contact holder 230, the contacts 220, 222, and the first contact shield 250.

The first cable 202 includes the first conductor 210 and the second conductor 212. The first and second conductors 210, 212 are configured to be electrically connected to the first and second contacts 220, 222. For example, the ends of the conductors 210, 212 may be soldered or welded to the ends of the contacts 220, 222. Other types of connections may be provided in alternative embodiments, such as crimped connections, insulation displacement connections, or other types of terminations. An insulator 214 holds the first and second conductors 210, 212. Optionally, a separate insulator may be provided for each of the conductors 210, 212. The cable 202 includes a cable shield 216 surrounding the insulator 214. The cable shield 216 extends the length of the cable 202 and provides electrical shielding for the first and second conductors 210, 212. The cable shield 216 is configured to be electrically connected to the contact shield 250. In an exemplary embodiment, a jacket 218 surrounds the cable shield 216.

The contact holder 230 holds the contacts 220, 222. In an exemplary embodiment, the contact holder 230 includes contact channels 232 that receive the contacts 220, 222. The contact holder 230 extends between a front 234 and a rear 236. The contact channels 232 extend longitudinally through the contact holder 230 between the front 234 and the rear 236. Optionally, the contact holder 230 may receive the end of the cable 202 at the rear 236. The exposed portions of the conductors 210, 212 may be received in the contact holder 230, such as in the contact channels 232, for termination to terminating ends 224 of the contacts 220, 222. In an exemplary embodiment, mating ends 226 of the contacts 220, 222 extend forward of the front 234 of the contact holder 230, such as for mating with the second cable connector assembly 300 (shown in FIG. 11). In the illustrated embodiment, the mating ends 226 form sockets. However, other types of mating ends may be provided in alternative embodiments, such as pins, blades, spring beams, and the like. In an exemplary embodiment, the contacts 220, 222 are stamped and formed contacts.

In an exemplary embodiment, the contact holder 230 includes one or more holder locating features 238. The holder locating features 238 interface with the shield locating features 290 to locate the contact shield 250 relative to the contact holder 230. In the illustrated embodiment, the holder locating features 238 are posts or tabs extending from the sides of the contact holder 230 that are configured to be received in the notches or cutouts in the contact shield 250 forming the shield locating features 290. Other types of locating features may be used in alternative embodiments.

The contact shield 250 includes an interior chamber that receives the contacts 220, 222, the contact holder 230, and the end of the cable 202. The contact shield 250 is configured to be electrically connected to the cable shield 216. For example, the contact shield 250 includes grounding tabs 292 bent inward toward the cable 202. The grounding tabs 292 engage the cable shield 216 to electrically connect the contact shield 250 to the cable shield 216. Optionally, the grounding tabs 292 may pierce the jacket 218 to interface with the cable shield 216. The contact shield 250 spans along a length of the cable 202 and spans along a length of the contacts 220, 222. In an exemplary embodiment, the contact shield 250 spans the entire lengths of the contacts 220, 222, such as extending forward of the mating ends 226 of the contacts 220, 222 and rearward of the terminating ends 224 of the contacts 220, 222. The contact shield 250 provides circumferential shielding around the mating interface at the mating ends 226 of the contacts 220, 222 and provides circumferential shielding around the terminating interface at the terminating ends 224 of the contacts 220, 222. The shielding is continuous from the cable 202 forward beyond the mating interface with the second cable connector assembly 300.

The contact shield 250 includes the forward portion 280 and the rearward portion 282. In the illustrated embodiment, the forward portion 280 covers the mating ends 226 of the contacts 220, 222 and the rearward portion 282 covers the terminating ends 224 of the contacts 220, 222 and covers a portion of the cable 202. The mating ends 226 of the contacts 220, 222 are located in the shroud chamber 258 and the terminating ends 224 of the contacts 220, 222 are located in the base chamber 256. The shroud chamber 258 forms a space configured to receive the contacts 320, 322 of the second cable connector assembly 300 to provide shielding around the mating interface of the contacts 220, 222 with the contacts 320, 322. In an exemplary embodiment, the walls forming the shroud chamber 258 along the forward portion 280 are located a first shield distance 294 from the first and second contacts 220, 222 and the walls forming the base chamber 256 along the rearward portion 282 are located a second shield distance 296 from the first and second contacts 220, 222. In the illustrated embodiment, the first shield distance 294 is greater than the second shield distance 296. For example, the contact shield 250 is closer to the contacts 220, 222 at the terminating ends 224 and the contact shield 250 is further from the contacts 220, 222 at the mating ends 226. The distances 294, 296 may be selected to control impedance along the signal transmission lines. For example, due to shaped changes of the contacts 220, 222 as well as exposure to air rather than traveling through the dielectric material of the contact holder 230, the shield distances 294, 296 may change along the lengths of the contacts 220, 222.

Figure 11:
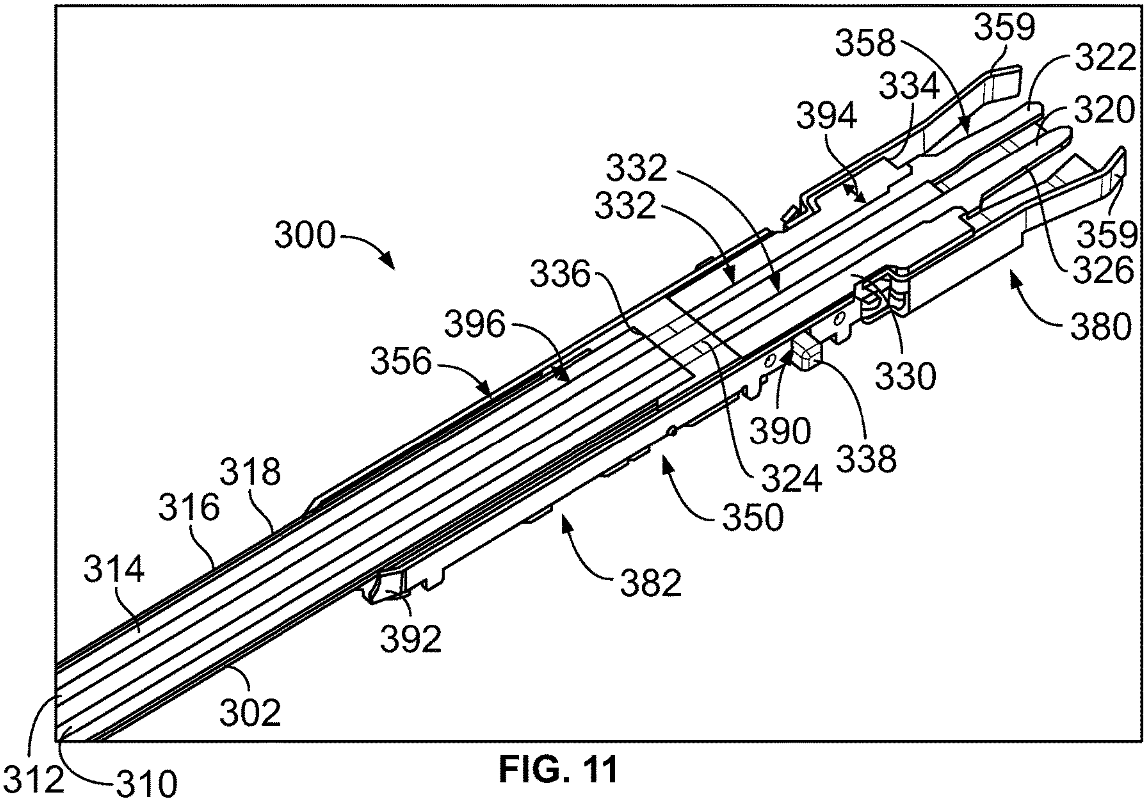
FIG. 11 is a cross-sectional view of the second cable connector assembly in accordance with an exemplary embodiment.

FIG. 11 is a cross-sectional view of the second cable connector assembly 300 in accordance with an exemplary embodiment. The cable connector assembly 300 includes the second cable 302, the second contact holder 330, the contacts 320, 322, and the second contact shield 350.

The second cable 302 includes the first conductor 310 and the second conductor 312. The first and second conductors 310, 312 are configured to be electrically connected to the first and second contacts 320, 322. For example, the ends of the conductors 310, 312 may be soldered or welded to the ends of the contacts 320, 322. Other types of connections may be provided in alternative embodiments, such as crimped connections, insulation displacement connections, or other types of terminations. An insulator 314 holds the first and second conductors 310, 312. Optionally, a separate insulator may be provided for each of the conductors 310, 312. The cable 302 includes a cable shield 316 surrounding the insulator 314. The cable shield 316 extends the length of the cable 302 and provides electrical shielding for the first and second conductors 310, 312. The cable shield 316 is configured to be electrically connected to the contact shield 350. In an exemplary embodiment, a jacket 318 surrounds the cable shield 316.

The contact holder 330 holds the contacts 320, 322. In an exemplary embodiment, the contact holder 330 includes contact channels 332 that receive the contacts 320, 322. The contact holder 330 extends between a front 334 and a rear 336. The contact channels 332 extend longitudinally through the contact holder 330 between the front 334 and the rear 336. Optionally, the contact holder 330 may receive the end of the cable 302 at the rear 336. The exposed portions of the conductors 310, 312 may be received in the contact holder 330, such as in the contact channels 332, for termination to terminating ends 324 of the contacts 320, 322. In an exemplary embodiment, mating ends 326 of the contacts 320, 322 extend forward of the front 334 of the contact holder 330, such as for mating with the first cable connector assembly 200 (shown in FIG. 10). In the illustrated embodiment, the mating ends 326 form pins. However, other types of mating ends may be provided in alternative embodiments, such as sockets, blades, spring beams, and the like. In an exemplary embodiment, the contacts 320, 322 are stamped and formed contacts.

In an exemplary embodiment, the contact holder 330 includes one or more holder locating features 338. The holder locating features 338 interface with the shield locating features 390 to locate the contact shield 350 relative to the contact holder 330. In the illustrated embodiment, the holder locating features 338 are posts or tabs extending from the sides of the contact holder 330 that are configured to be received in the notches or cutouts in the contact shield 350 forming the shield locating features 390. Other types of locating features may be used in alternative embodiments.

The contact shield 350 includes an interior chamber that receives the contacts 320, 322, the contact holder 330, and the end of the cable 302. The contact shield 350 is configured to be electrically connected to the cable shield 316. For example, the contact shield 350 includes grounding tabs 392 bent inward toward the cable 302. The grounding tabs 392 engage the cable shield 316 to electrically connect the contact shield 350 to the cable shield 316. Optionally, the grounding tabs 392 may pierce the jacket 318 to interface with the cable shield 316.

In an exemplary embodiment, the contact shield 350 includes the grounding fingers 359 at the front of the shroud 254. The grounding fingers 359 are configured to be plugged into the receptacle defined by the shroud chamber 258 of the contact shield 250. The grounding fingers 359 extend along the mating ends of the first and second contacts 320, 322. The grounding fingers 359 provide electrical shielding for the contacts 320, 322. The contact shield 350 spans along a length of the cable 302 and spans along a length of the contacts 320, 322. In an exemplary embodiment, the contact shield 350 spans the entire lengths of the contacts 320, 322, such as extending forward of the mating ends 326 of the contacts 320, 322 and rearward of the terminating ends 324 of the contacts 320, 322. For example, the grounding fingers 359 may extend along the mating ends 326. The contact shield 350 provides shielding around the mating interface at the mating ends 326 of the contacts 320, 322 and provides shielding around the terminating interface at the terminating ends 324 of the contacts 320, 322.

The contact shield 350 includes the forward portion 380 and the rearward portion 382. In the illustrated embodiment, the forward portion 380 covers the mating ends 326 of the contacts 320, 322 and the rearward portion 382 covers the terminating ends 324 of the contacts 320, 322 and covers a portion of the cable 302. The mating ends 326 of the contacts 320, 322 are located in the shroud chamber 358 and the terminating ends 324 of the contacts 320, 322 are located in the base chamber 356. In an exemplary embodiment, the walls forming the shroud chamber 358 along the forward portion 380 are located a first shield distance 394 from the first and second contacts 320, 322 and the walls forming the base chamber 356 along the rearward portion 382 are located a second shield distance 396 from the first and second contacts 320, 322. In the illustrated embodiment, the first shield distance 394 is greater than the second shield distance 396. For example, the contact shield 350 is closer to the contacts 320, 322 at the terminating ends 324 and the contact shield 350 is further from the contacts 320, 322 at the mating ends 326. The distances 394, 396 may be selected to control impedance along the signal transmission lines. For example, due to shaped changes of the contacts 320, 322 as well as exposure to air rather than traveling through the dielectric material of the contact holder 330, the shield distances 394, 396 may change along the lengths of the contacts 320, 322.

Returning to FIGS. 8 and 9, when the first and second cable connector assemblies 200, 300 are mated, the contacts 220, 222 (FIG. 9) are electrically connected to the contacts 320, 322 at mating interfaces. The contact shields 250, 350 are electrically connected together to form a continuous shield along the mating interfaces. In an exemplary embodiment, the second contact shield 350 is plugged into the shroud chamber 258 of the shroud 254 of the first contact shield 250. The grounding fingers 359 (shown in FIG. 11) are loaded into the shroud chamber 258 and engage the interior surface of the shroud 254 to electrically connect the second contact shield 350 to the first contact shield 250. The shroud 254 of the first contact shield 250 forms a sleeve that surrounds the second contact shield 350. The first and second contact shields 250, 350 provide 360° shielding around the mating interfaces of the contacts 220, 222, 320, 322. The contacts 220, 222, 320, 322 are located in the shroud chamber 258 and surrounded by the contact shields

250, 350. Both signal transmission lines are fully shielded along the entire lengths thereof (for example, from the cable 202 to the cable 302).

Figure 12:
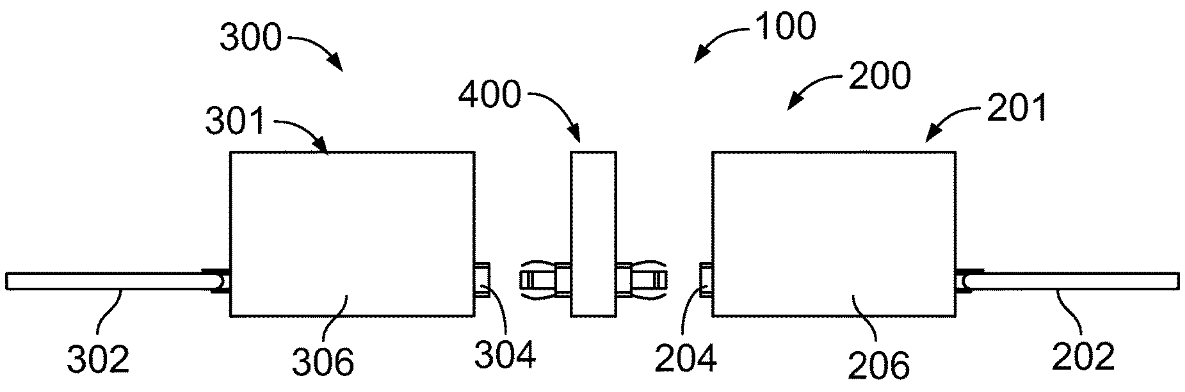
FIG. 12 is a side view of the communication system in accordance with an exemplary embodiment showing the first and second cable connector assemblies unmated from each other.
Figure 13:
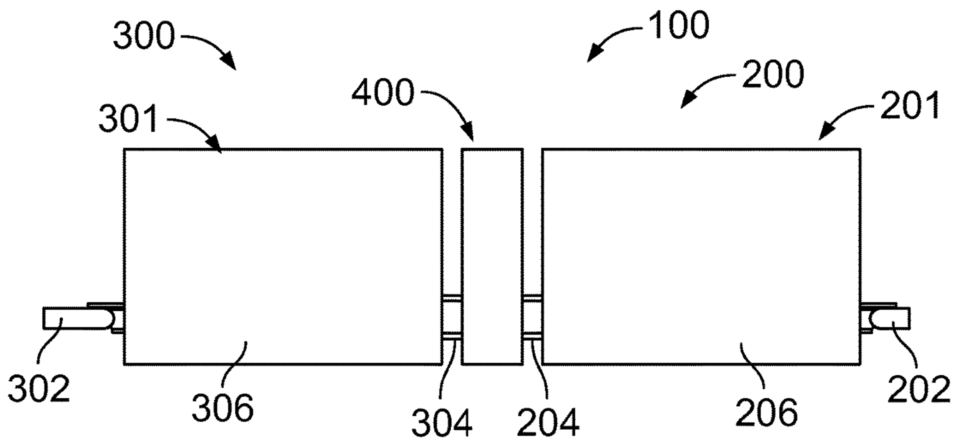
FIG. 13 is a side view of the communication system in accordance with an exemplary embodiment showing the first and second cable connector assemblies mated with each other.

FIG. 12 is a side view of the communication system 100 in accordance with an exemplary embodiment showing the first and second cable connector assemblies 200, 300 unmated from each other. FIG. 13 is a side view of the communication system 100 in accordance with an exemplary embodiment showing the first and second cable connector assemblies 200, 300 mated with each other. In the illustrated embodiment, the first cable connector assembly 200 includes an adapter module 400. The adapter module 400 is used to change a mating interface of the first cable connector assembly 200.

In an exemplary embodiment, the communication system 100 includes one or more of the cables 202 coupled to the first connector housing 206 to form a first electrical connector 201 and the second cable connector assembly 300 includes one or more of the cables 302 coupled to the second connector housing 306 to form a second electrical connector 301. In an exemplary embodiment, the first and second electrical connectors 201, 301 have similar mating interfaces. The adapter module 400 changes the mating interface of the first cable connector assembly 200 to allow mating with the second cable connector assembly 300. In the illustrated embodiment, the first and second electrical connectors 201, 301 both have female mating interfaces (for example, receptacle/socket) while the adapter module 400 has male mating interfaces (for example, plug/pin). Another embodiment may include first and second electrical connectors having male interfaces while the adapter has a female-to-female interface. The first and second electrical connectors 201, 301 are not directly mate-able with each other. However, the adapter module 400 is mate-able with the mating interface of the first electrical connector 201 and mate-able with the mating interface of the second electrical connector 301 to allow interconnection of the first and second cable connector assemblies 200, 300. The adapter module 400 changes the mating interface of the first cable connector assembly 200 to allow mating with the second cable connector assembly 300.

The shield structures 204, 304 are electrically connected when fully mated to provide 360° shielding for the signal contacts and the signal conductors of the cables 202, 302 along lengths thereof. The adapter module 400 forms part of the shield structure 204 of the first cable connector assembly 200.

Figure 14:
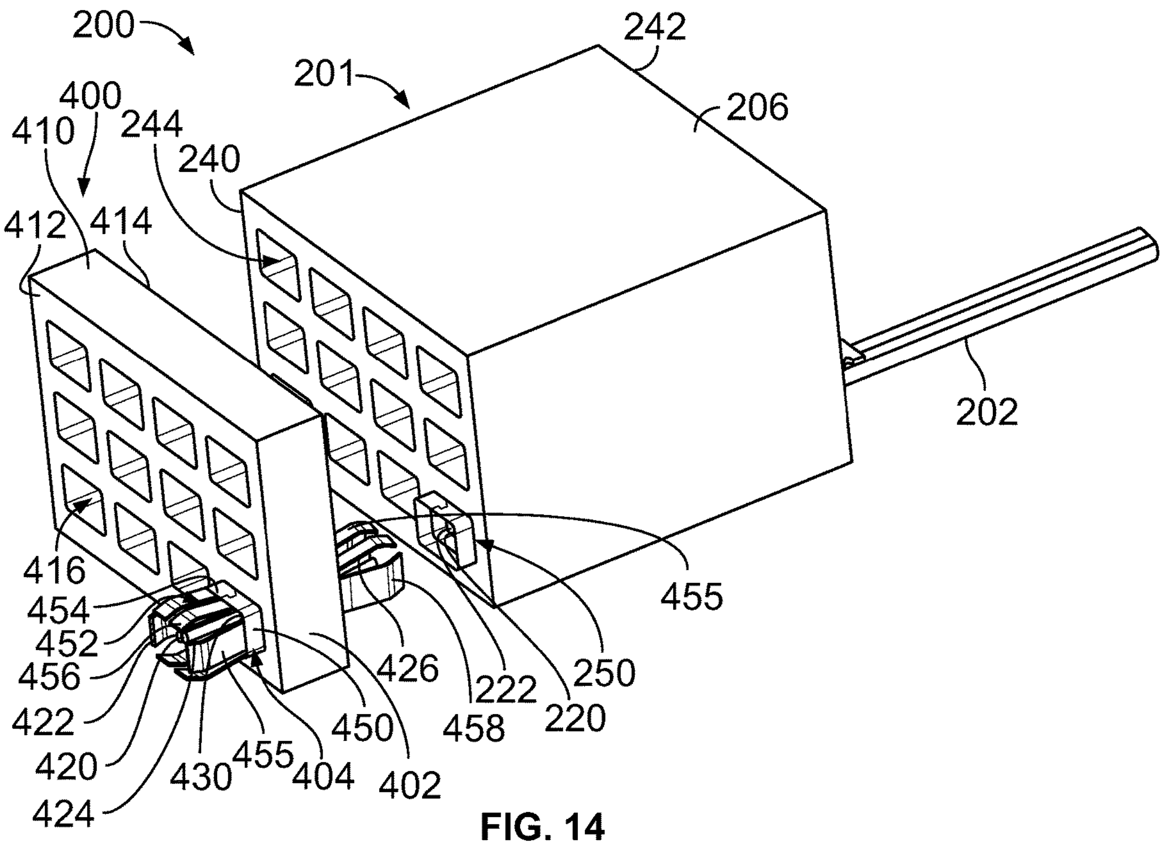
FIG. 14 is a front perspective, exploded view of the first cable connector assembly in accordance with an exemplary embodiment.
Figure 15:
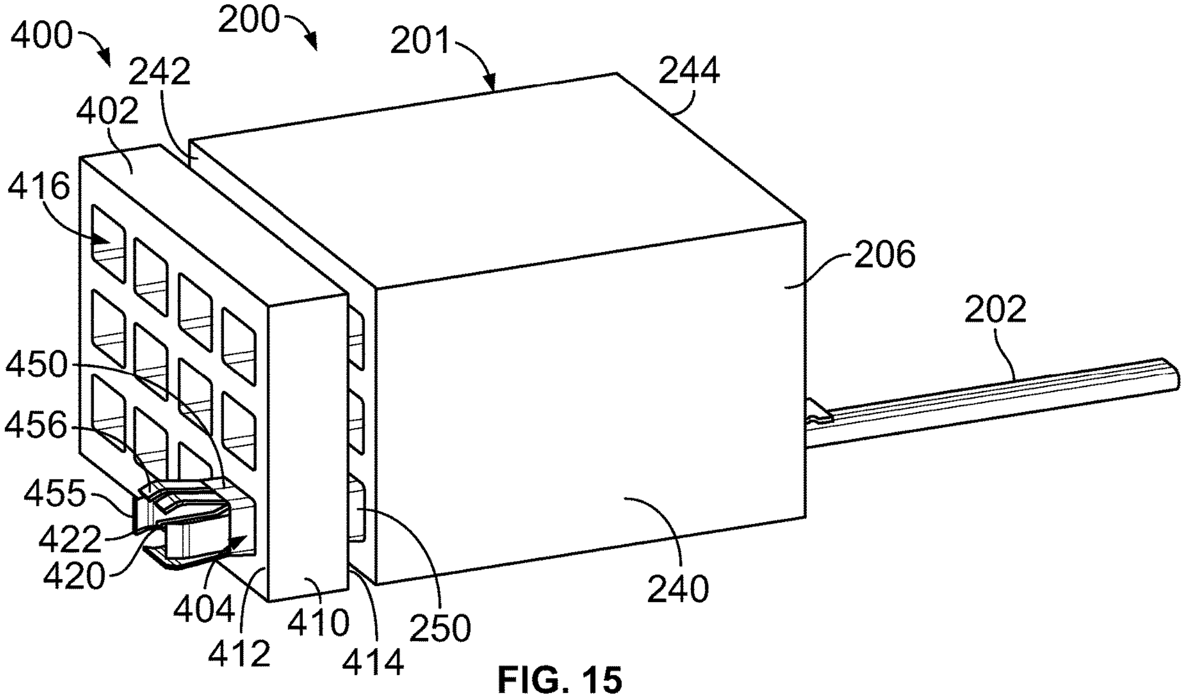
FIG. 15 is a front perspective, assembled view of the first cable connector assembly in accordance with an exemplary embodiment.

FIG. 14 is a front perspective, exploded view of the first cable connector assembly 200 in accordance with an exemplary embodiment. FIG. 15 is a front perspective, assembled view of the first cable connector assembly 200. FIGS. 14 and 15 illustrate the adapter module 400 at the mating end of the first cable connector assembly 200 forward of the first electrical connector 201.

The connector housing 206 is a dielectric body. The connector housing 206 may be a molded part. The connector housing 206 extends between a front 240 and a rear 242. The front 240 faces the adapter module 400. The connector housing 206 includes one or more cable cavities 244, such as in a 3×4 array (for example, three rows and four columns). Each cable cavity 244 receives the corresponding cable 202, the contact holder 230, the first and second contacts 220, 222, and the contact shield 250.

The adapter module 400 includes an adapter housing 402 holding one or more adapter contact assemblies 404 coupled to the adapter housing 402. FIGS. 14 and 15 illustrate a single adapter contact assembly 404; however, the adapter module 400 may include multiple adapter contact assemblies 404, such as in a 3×4 array (3 rows and four columns of adapter contact assemblies 404). The adapter module 400 may include greater or fewer rows and greater or fewer columns in alternative embodiments.

The adapter housing 402 includes a dielectric body 410 holding the one or more adapter contact assemblies 404. The adapter housing 402 extends between a front 412 and a rear 414. The rear 414 faces the first electrical connector 201. The front 412 is configured to be mated with the second cable connector assembly 300 (shown in FIGS. 12 and 13). The adapter housing 402 includes one or more adapter housing cavities 416 that receive corresponding adapter contact assemblies 404. The adapter housing cavities 416 are aligned with the cable cavities 244.

The adapter contact assembly 404 is configured to electrically connect the first and second cable connector assemblies 200, 300. The adapter contact assembly 404 includes a first adapter contact 420 and a second adapter contact 422. The adapter contact assembly 404 includes an adapter module shield 450 providing electrical shielding for the adapter contacts 420, 422. In an exemplary embodiment, the adapter contact assembly 404 includes a contact holder 430 holding the adapter contacts 420, 422. The contact holder 430 is received in a shield cavity 452 of the adapter module shield 450. The contact holder 430 is manufactured from a dielectric material to isolate the adapter contacts 420, 422 from the adapter module shield 450.

The adapter contacts 420, 422 each have a front mating end 424 and a rear mating end 426. The rear mating ends 426 of the adapter contacts 420, 422 are configured to be mated with the mating ends 226 of the first and second contacts 220, 222. The front mating ends 424 are configured to be mated with the mating ends 326 of the contacts 320, 322 of the second cable connector assembly 300. In the illustrated embodiment, the front mating ends 424 are identical to the rear mating ends 426. For example, both the front and rear mating ends 424, 426 may be pin contacts. However, other types of mating ends may be used in alternative embodiments, such as sockets, blades, spring beams, and the like. The mating ends 424, 426 extend from the adapter housing 402, such as for plugging into the first and second electrical connectors 201, 301.

The adapter module shield 450 includes a main body 454 defining the shield cavity 452. The adapter module shield 450 includes a front mating end 456 and a rear mating end 458. The rear mating end 458 is configured to be mated with the first contact shield 250. The front mating end 456 is configured to be mated with the second contact shield 350 of the second cable connector assembly 300. In the illustrated embodiment, the front mating end 456 is identical to the rear mating end 458. For example, both the front and rear mating ends 456, 458 include grounding tabs 455 configured to be plugged into the shroud chambers of the contact shields 250, 350. However, other types of mating ends may be used in alternative embodiments. The mating ends 456, 458 extend from the adapter housing 402, such as for plugging into the first and second electrical connectors 201, 301.

Figure 16:
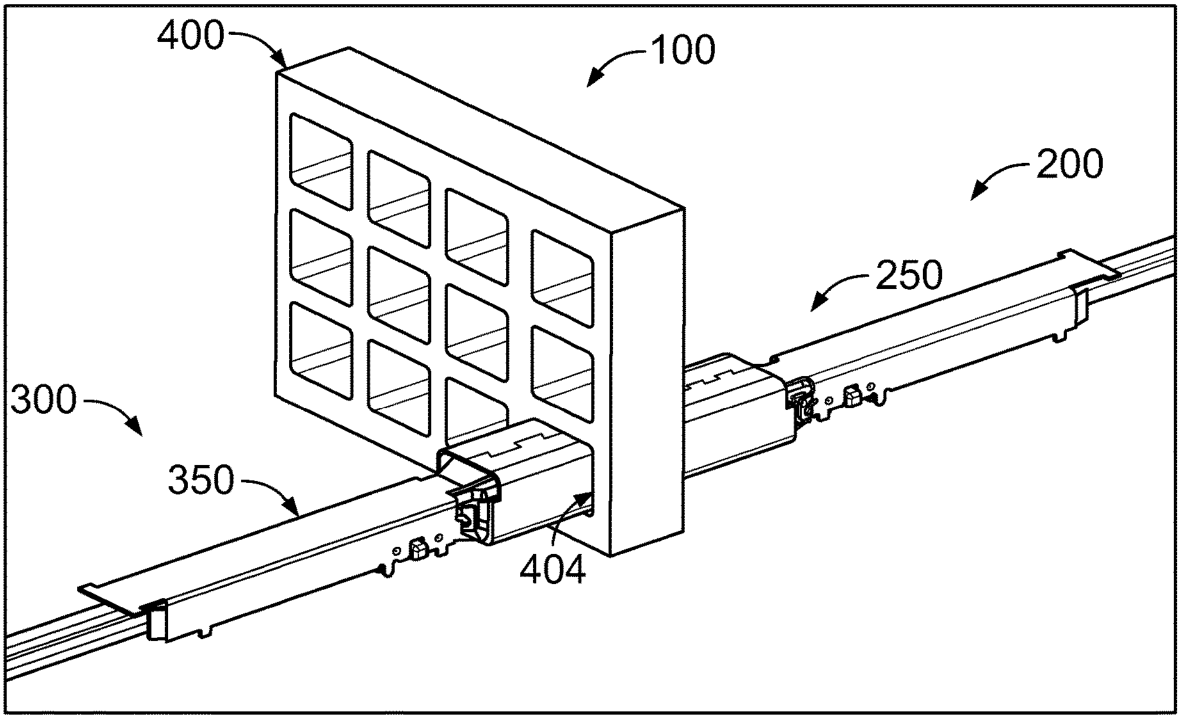
FIG. 16 is a front perspective view of a portion of the communication system showing an adapter module coupled to the first cable connector assembly and the second cable connector assembly in accordance with an exemplary embodiment.
Figure 17:
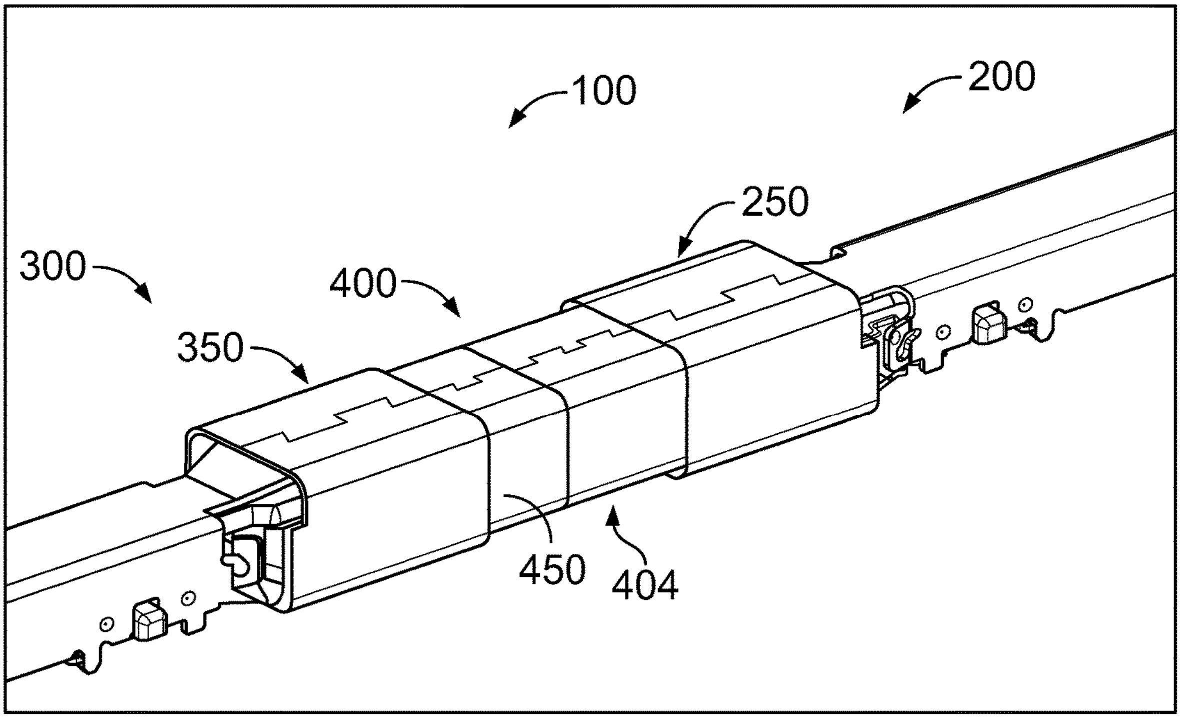
FIG. 17 is a front perspective view of a portion of the communication system in accordance with an exemplary embodiment.

FIG. 16 is a front perspective view of a portion of the communication system 100 showing the adapter module 400 coupled to the first cable connector assembly 200 and the second cable connector assembly 300 in accordance with an exemplary embodiment. FIG. 17 is a front perspective view of a portion of the communication system 100 in accordance with an exemplary embodiment. The connector housings 206, 306 (shown in FIGS. 12 and 13) are removed for clarity to illustrate portions of the first and second cable connector assemblies 200, 300.

The cable connector assemblies 200, 300 are shown mated to the adapter contact assembly 404. When mated, the adapter module shield 450 is coupled to the first and second contact shields 250, 350. The adapter contacts 420, 422 are coupled to the contacts 220, 222 of the first cable connector assembly 200 and to the contacts 320, 322 of the second cable connector assembly 300.

Figure 18:
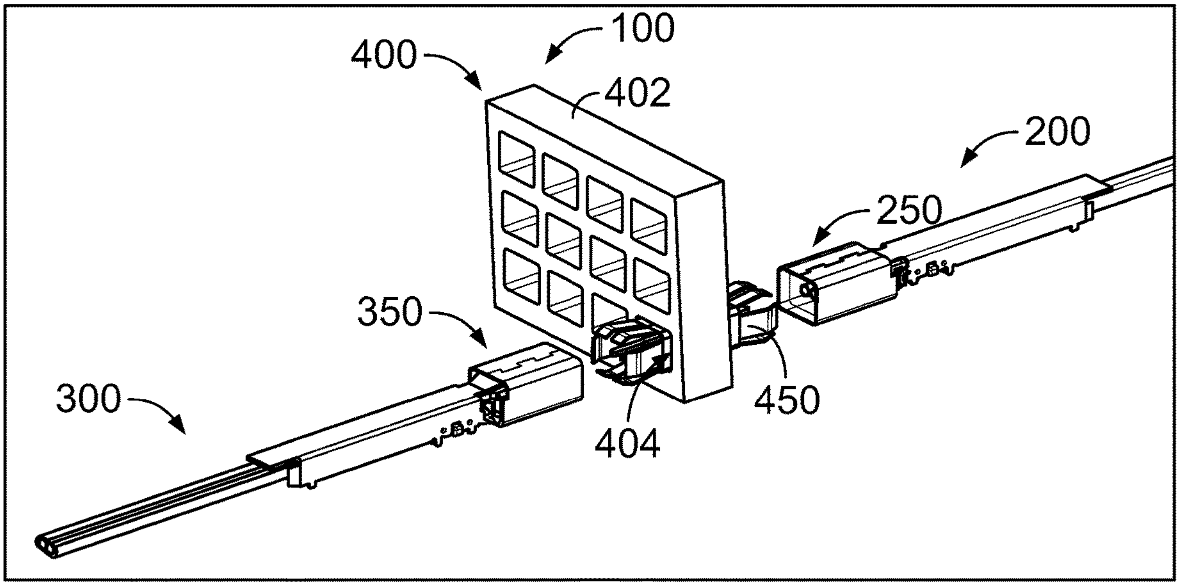
FIG. 18 is a front perspective view of a portion of the communication system showing the adapter module poised for coupling to the first cable connector assembly and the second cable connector assembly in accordance with an exemplary embodiment.
Figure 19:
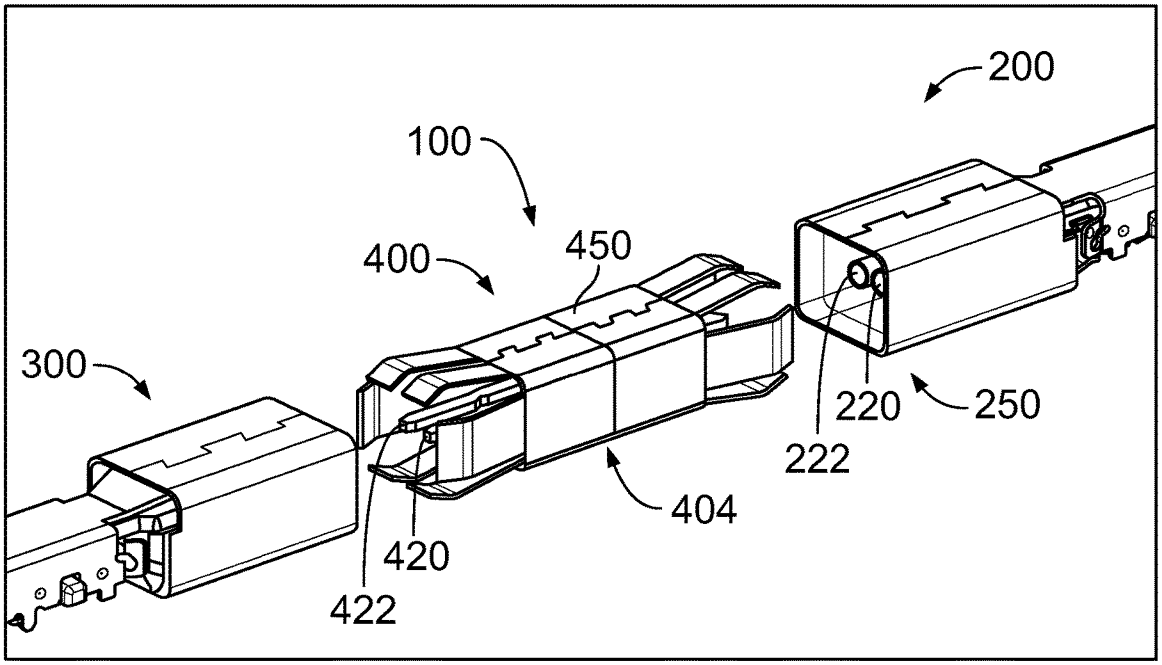
FIG. 19 is a front perspective, exploded view of a portion of the communication system in accordance with an exemplary embodiment.

FIG. 18 is a front perspective view of a portion of the communication system 100 showing the adapter module 400 poised for coupling to the first cable connector assembly 200 and the second cable connector assembly 300 in accordance with an exemplary embodiment. FIG. 19 is a front perspective, exploded view of a portion of the communication system 100 in accordance with an exemplary embodiment. The adapter module 400 and the cable connector assemblies 200, 300 may be provided without the adapter housing 402 or the connector housings 206, 306 (shown in FIGS. 12 and 13).

The cable connector assemblies 200, 300 are shown mated to the adapter contact assembly 404. When mated, the adapter module shield 450 is coupled to the first and second contact shields 250, 350. The adapter contacts 420, 422 are coupled to the contacts 220, 222 of the first cable connector assembly 200 and to the contacts 320, 322 of the second cable connector assembly 300.

Figure 20:
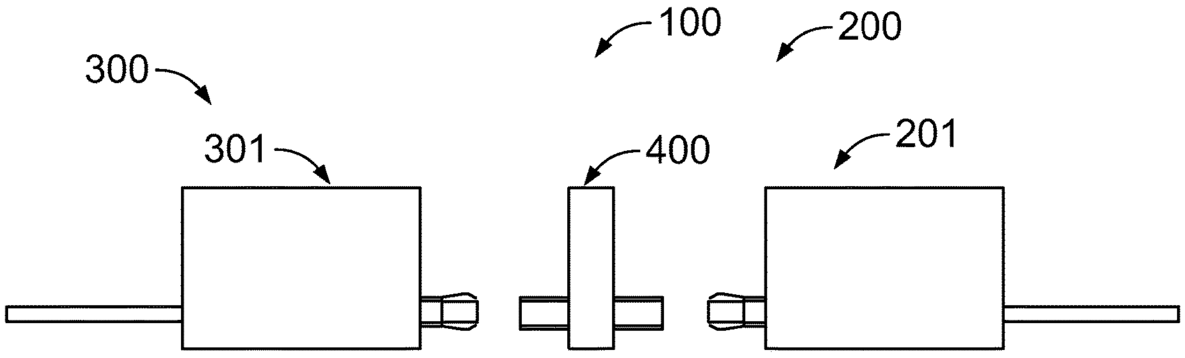
FIG. 20 is a side view of the communication system in accordance with an exemplary embodiment showing the first and second cable connector assemblies unmated from each other.
Figure 21:
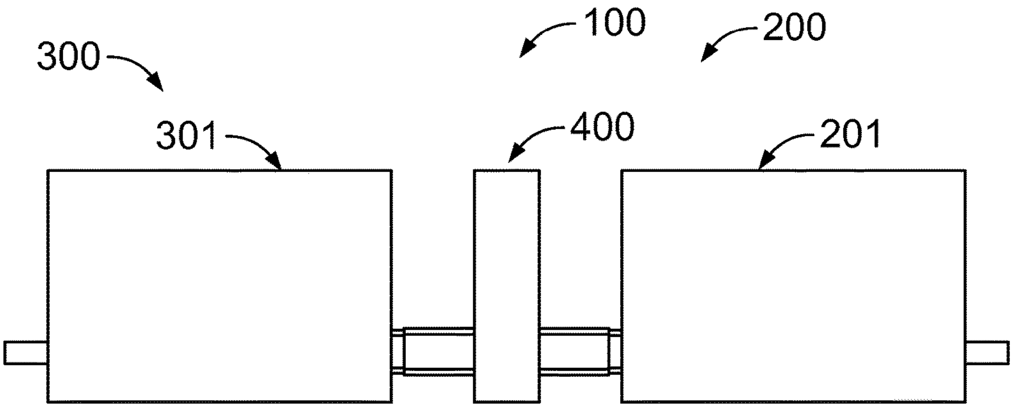
FIG. 21 is a side view of the communication system in accordance with an exemplary embodiment showing the first and second cable connector assemblies mated with each other.

FIG. 20 is a side view of the communication system 100 in accordance with an exemplary embodiment showing the first and second cable connector assemblies 200, 300 unmated from each other. FIG. 21 is a side view of the communication system 100 in accordance with an exemplary embodiment showing the first and second cable connector assemblies 200, 300 mated with each other. In the illustrated embodiment, the first cable connector assembly 200 includes the adapter module 400. The adapter module 400 is used to change a mating interface of the first cable connector assembly 200. The adapter module 400 has a different interface than the interface shown in FIGS. 12 and 13.

In an exemplary embodiment, the first and second electrical connectors 201, 301 have similar mating interfaces. The adapter module 400 changes the mating interface of the first cable connector assembly 200 to allow mating with the second cable connector assembly 300. In the illustrated embodiment, the first and second electrical connectors 201, 301 both have male mating interfaces (for example, plug/pin) while the adapter module 400 has female mating interfaces (for example, receptacle/socket). The first and second electrical connectors 201, 301 are not directly mate-able with each other. However, the adapter module 400 is mate-able with the mating interface of the first electrical connector 201 and mate-able with the mating interface of the second electrical connector 301 to allow interconnection of the first and second cable connector assemblies 200, 300. The adapter module 400 changes the mating interface of the first cable connector assembly 200 to allow mating with the second cable connector assembly 300.

Figure 22:
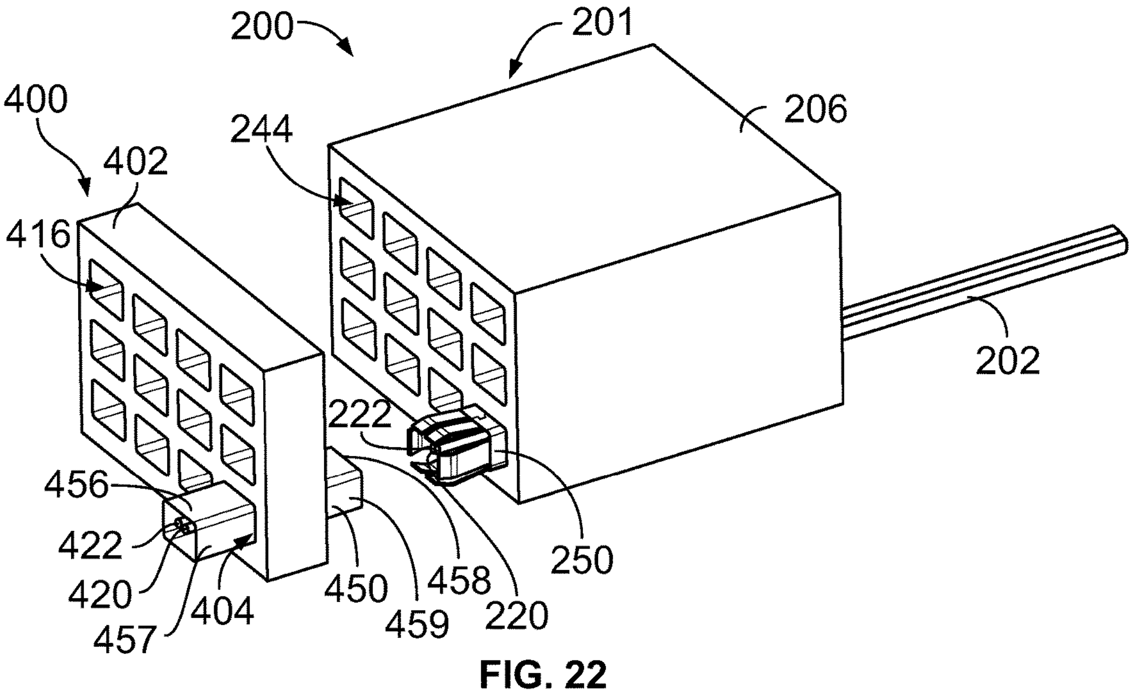
FIG. 22 is a front perspective, exploded view of the first cable connector assembly in accordance with an exemplary embodiment.
Figure 23:
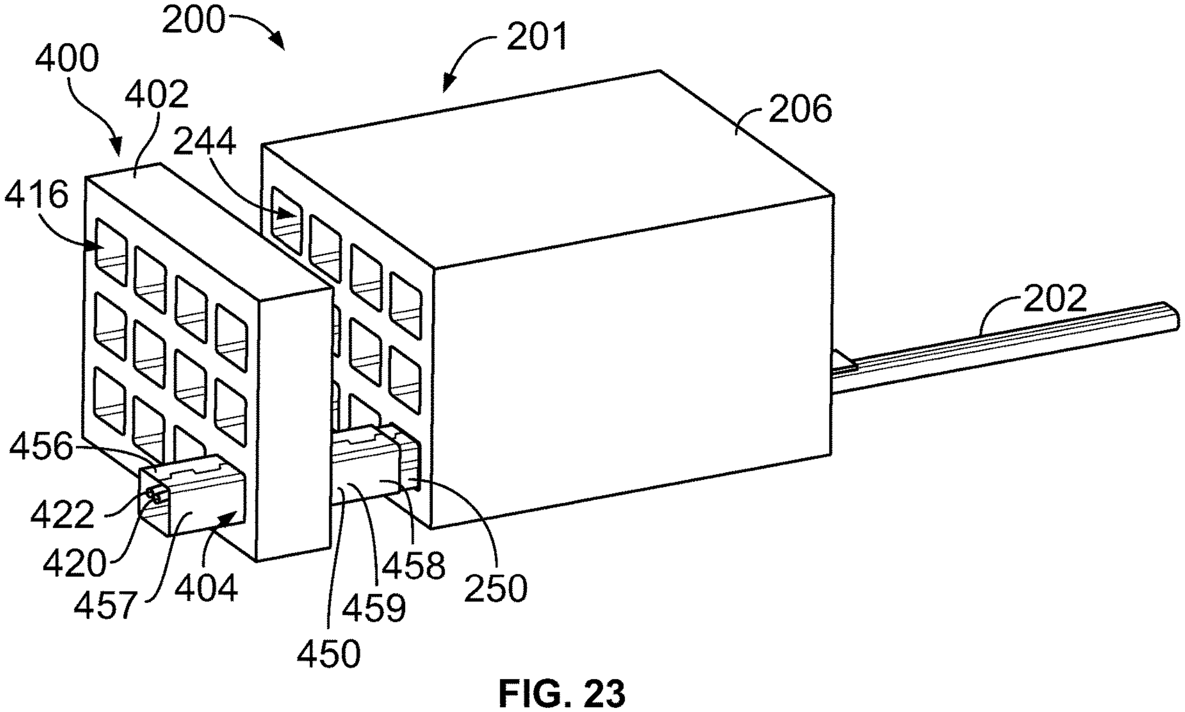
FIG. 23 is a front perspective, assembled view of the first cable connector assembly in accordance with an exemplary embodiment.

FIG. 22 is a front perspective, exploded view of the first cable connector assembly 200 in accordance with an exemplary embodiment. FIG. 23 is a front perspective, assembled view of the first cable connector assembly 200. FIGS. 22 and 23 illustrate the adapter module 400 at the mating end of the first cable connector assembly 200 forward of the first electrical connector 201. The connector housing 206 includes one or more cable cavities 244 each configured to hold the corresponding cable 202, the contact holder 230, the first and second contacts 220, 222, and the contact shield 250. The adapter housing 402 includes one or more of the adapter housing cavities 416 configured to hold the corresponding adapter contact assemblies 404.

The adapter contact assembly 404 includes the first adapter contact 420 and the second adapter contact 422. In the illustrated embodiment, the adapter contacts 420, 422 are socket contacts. The adapter module shield 450 provides electrical shielding for the adapter contacts 420, 422. The adapter module shield 450 includes a front shroud 457 at the front mating end 456 and a rear shroud 459 at the rear mating end 458. The front and rear shrouds 457, 459 define receptacles that receive the mating ends of the first and second contact shields 250, 350.

Figure 24:
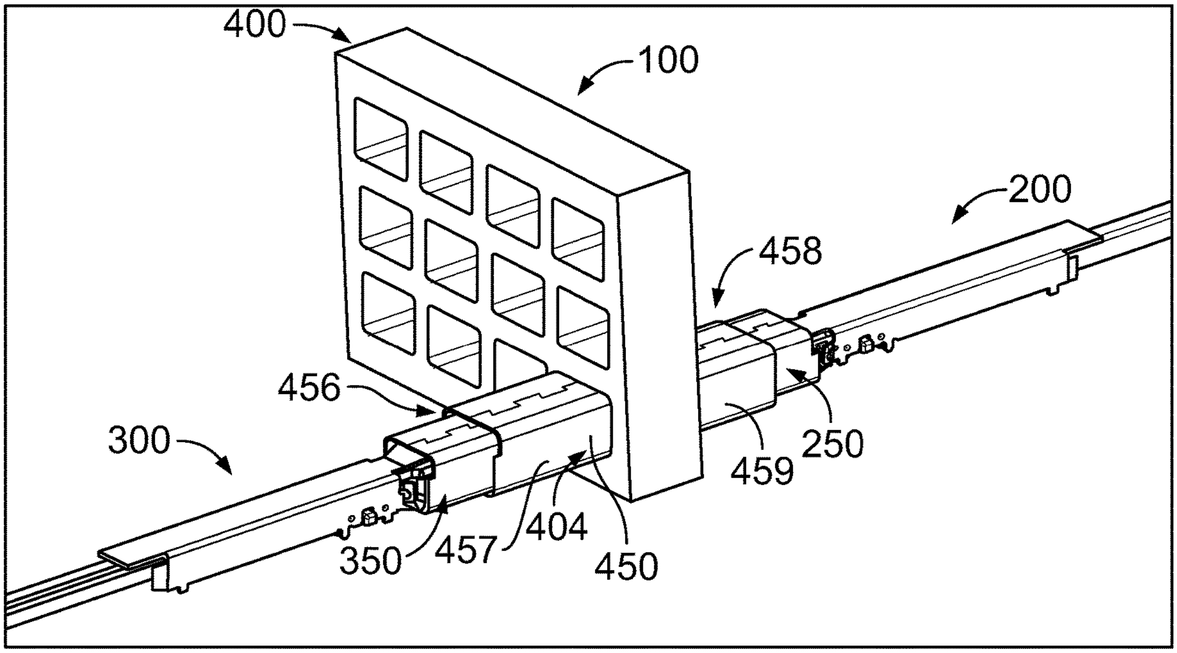
FIG. 24 is a front perspective view of a portion of the communication system showing the adapter module coupled to the first cable connector assembly and the second cable connector assembly in accordance with an exemplary embodiment.
Figure 25:
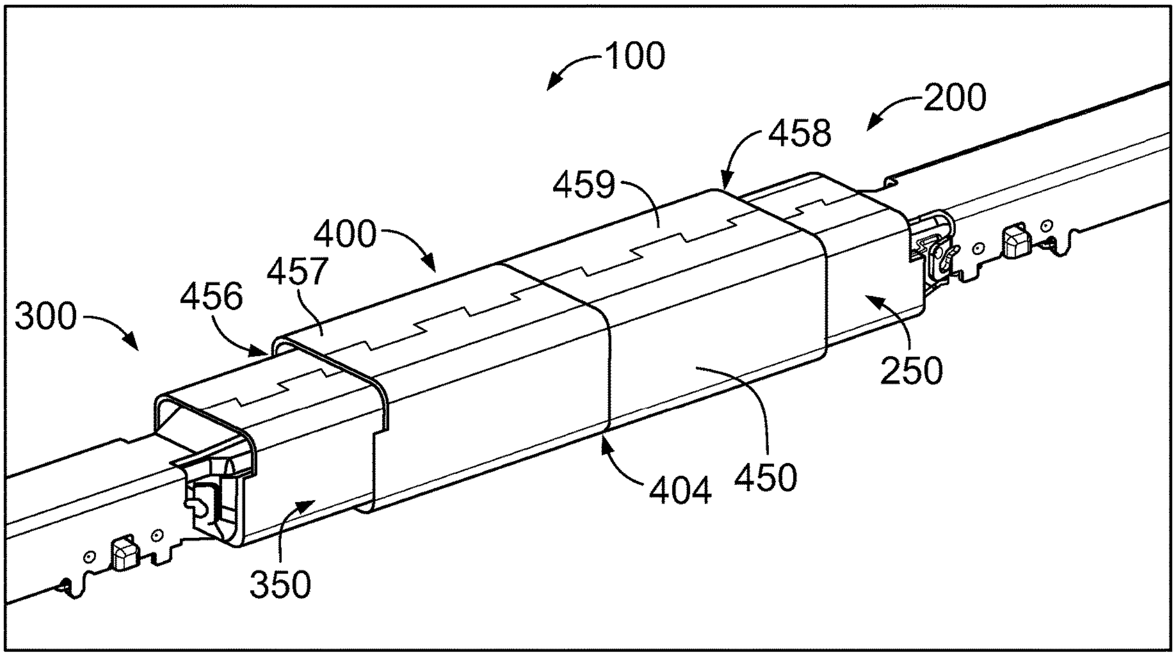
FIG. 25 is a front perspective view of a portion of the communication system in accordance with an exemplary embodiment.

FIG. 24 is a front perspective view of a portion of the communication system 100 showing the adapter module 400 coupled to the first cable connector assembly 200 and the second cable connector assembly 300 in accordance with an exemplary embodiment. FIG. 25 is a front perspective, exploded view of a portion of the communication system 100 in accordance with an exemplary embodiment. The connector housings 206, 306 (shown in FIGS. 16 and 17) are removed for clarity to illustrate portions of the first and second cable connector assemblies 200, 300.

The cable connector assemblies 200, 300 are shown mated to the adapter contact assembly 404. When mated, the adapter module shield 450 is coupled to the first and second contact shields 250, 350. For example, the first and second contact shields 250, 350 are plugged into the front and rear shrouds 457, 459 and the front and rear mating ends 456, 458.

Figure 26:
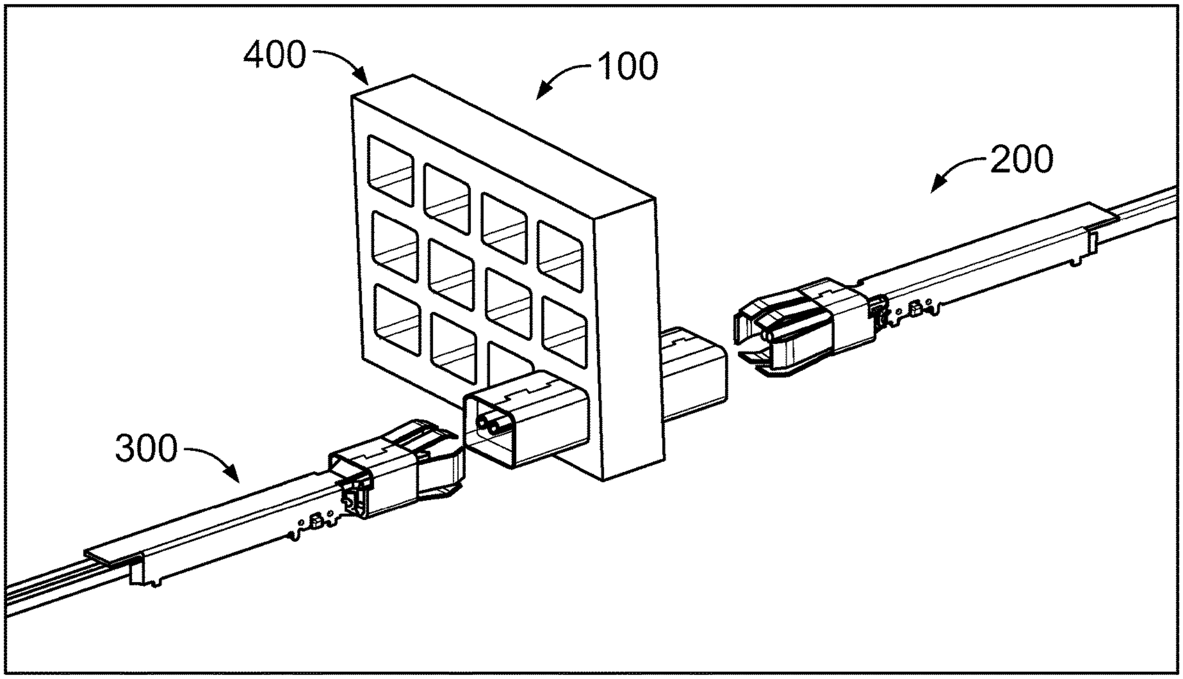
FIG. 26 is a front perspective view of a portion of the communication system showing the adapter module poised for coupling to the first cable connector assembly and the second cable connector assembly in accordance with an exemplary embodiment.
Figure 27:
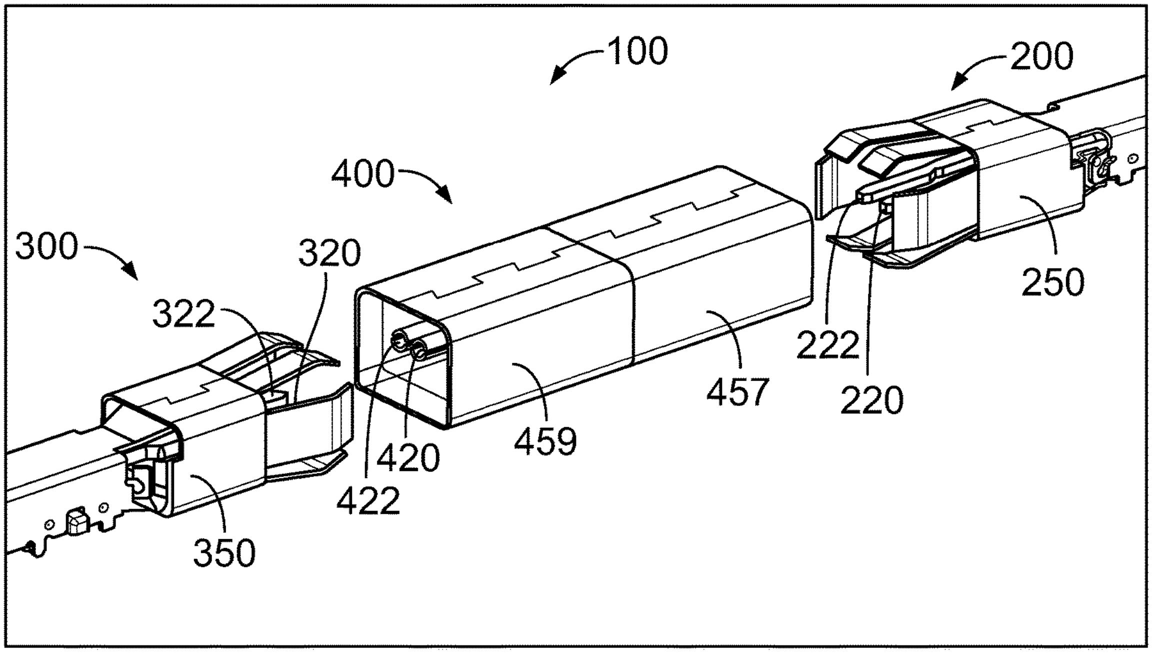
FIG. 27 is a front perspective, exploded view of a portion of the communication system in accordance with an exemplary embodiment.

FIG. 26 is a front perspective view of a portion of the communication system 100 showing the adapter module 400 poised for coupling to the first cable connector assembly 200 and the second cable connector assembly 300 in accordance with an exemplary embodiment. FIG. 27 is a front perspective view of a portion of the communication system 100 in accordance with an exemplary embodiment. The adapter module 400 and the cable connector assemblies 200, 300 may be provided without the adapter housing 402 or the connector housings 206, 306 (shown in FIGS. 16 and 17).

During mating, the first and second contact shields 250, 350 may be plugged into the front and rear shrouds 457, 459. The adapter contacts 420, 422 (for example, socket contacts) receive the contacts 220, 222 (for example, pin contacts) of the first cable connector assembly 200 and to the contacts 320, 322 (for example, pin contacts) of the second cable connector assembly 300.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A cable connector assembly comprising:

a cable having an insulator holding a first conductor and a second conductor, the cable having a cable shield surrounding the first and second conductors along a length of the cable;

a contact holder including a first contact channel and a second contact channel, the contact holder extending between a front and a rear, the cable coupled to the rear of the contact holder;

a first contact received in the first contact channel, the first contact being terminated to an end of the first conductor at a first interface, the first contact having a mating end forward of the front of the contact holder;

a second contact received in the second contact channel, the second contact being terminated to an end of the second conductor at a second interface, the second contact having a mating end forward of the front of the contact holder; and a contact shield coupled to the contact holder, the contact shield including a base and a shroud forward of the base, the base surrounding a base chamber on four sides thereof, the base chamber receives an end of the cable and the contact holder, the base surrounding the first and second contacts and the first and second conductors to provide electrical shielding at the first and second interfaces, the base being electrically connected to the cable shield, the shroud surrounding a shroud chamber on four sides thereof, the shroud chamber extends forward of the front of the contact holder and receives the mating ends of the first and second contacts to provide electrical shielding along four sides of the mating ends of the first and second contacts.

2. The cable connector assembly of claim 1, wherein the contact shield has a rectangular cross-section along a longitudinal axis of the cable connector assembly.

3. The cable connector assembly of claim 1, wherein the shroud includes a shroud top wall, a shroud bottom wall, a shroud first side wall, and a shroud second side wall forming a box-shaped shroud chamber.

4. The cable connector assembly of claim 1, wherein the base includes a base top wall, a base bottom wall, a base first side wall, and a base second side wall forming a box-shaped base chamber.

5. The cable connector assembly of claim 1, wherein the shroud provides 360° shielding around the shroud chamber.

6. The cable connector assembly of claim 1, wherein the base provides 360° shielding around the base chamber.

7. The cable connector assembly of claim 1, wherein the shroud includes deflectable fingers at a front end of the shroud configured to engage a contact field of a mating cable connector assembly.

8. The cable connector assembly of claim 1, wherein the contact shield is stamped and formed.

9. The cable connector assembly of claim 1, wherein the contact shield includes a forward portion and a rearward portion separate and discrete from the forward portion, the forward portion being stamped and formed to form at least a portion of the shroud, the rearward portion being stamped and formed to form at least a portion of the base.

10. The cable connector assembly of claim 9, wherein the forward portion includes a tail, the forward portion being coupled to the rearward portion such that the tail forms a portion of the base.

11. The cable connector assembly of claim 9, wherein the rearward portion includes connecting tabs engaging the forward portion to electrically connect the rearward portion to the forward portion.

12. The cable connector assembly of claim 9, wherein the forward portion is plated with a plating layer, the rearward portion being unplated.

13. The cable connector assembly of claim 9, wherein the forward portion is located a first shield distance from the first and second contacts and the rearward portion is located a second shield distance from the first and second contacts, the first shield distance being greater than the second shield distance.

14. The cable connector assembly of claim 1, wherein the contact holder includes a holder locating feature and the contact shield includes a shield locating feature, the holder locating feature interfacing with the shield locating feature to axially position the contact shield relative to the contact holder.

15. The cable connector assembly of claim 1, wherein the base includes grounding tabs bent inward toward the cable, the grounding tabs engaging the cable shield to electrically connect the contact shield to the cable shield.

16. The cable connector assembly of claim 1, further comprising a connector housing having a cable cavity, the cable cavity receiving the cable, the contact holder, the first and second contacts, and the contact shield.

17. The cable connector assembly of claim 1, wherein the shroud chamber forms a space configured to receive mating contacts of a mating cable connector assembly to provide shielding around the mating contacts and the interface between the mating contacts and the first and second contacts.

18. A cable connector assembly comprising:

a connector housing having a mating end and a cable end, the connector housing including cable cavities extending between the mating end and the cable end; and a plurality of cable assemblies received in corresponding cable cavities and coupled to the connector housing, each cable assembly including a cable and a contact assembly coupled to an end of the cable, the cable extending from the cable end of the connector housing, the cable having an insulator holding a first conductor and a second conductor, the cable having a cable shield surrounding the first and second conductors along a length of the cable, the contact assembly including a contact holder holding a first contact and a second contact, the contact assembly including a contact shield providing electrical shielding for the first and second contacts;

the contact holder including a first contact channel and a second contact channel, the contact holder extending between a front and a rear, the cable coupled to the rear of the contact holder;

the first contact received in the first contact channel, the first contact being terminated to an end of the first conductor at a first interface, the first contact having a mating end forward of the front of the contact holder;

the second contact received in the second contact channel, the second contact being terminated to an end of the second conductor at a second interface, the second contact having a mating end forward of the front of the contact holder; and the contact shield coupled to the contact holder, the contact shield including a base and a shroud forward of the base, the base located in the corresponding cable cavity, the shroud located at least one of at or forward of the mating end of the connector housing, the base surrounding a base chamber that receives an end of the cable and the contact holder, the base surrounding the first and second contacts and the first and second conductors to provide electrical shielding at the first and second interfaces, the base being electrically connected to the cable shield, the shroud surrounding a shroud chamber that receives the mating ends of the first and second contacts to provide electrical shielding along the mating ends of the first and second contacts.

19. The cable connector assembly of claim 18, further comprising an adapter module coupled to the mating end of the connector housing, the adapter module including an adapter housing having adapter housing cavities aligned with the cable cavities, the adapter module including a first adapter contact and a second adapter contact held in the adapter housing, the adapter module including an adapter module shield held in the adapter housing cavity, the adapter module shield surrounding the first and second adapter contacts, the adapter module shield being coupled to the contact shield, the first and second adapter contacts being coupled to rear mating ends of the first and second contacts, respectively, the first and second adapter contacts having front mating ends opposite the rear mating ends configured to be coupled to the mating contacts of a mating cable connector assembly, the adapter module shield configured to be coupled to a mating contact shield of the mating cable connector assembly.

20. A communication system comprising:

a first cable connector assembly including a first connector housing having first cable cavities extending between a mating end and a cable end, the first cable connector assembly including a plurality of first cable assemblies received in corresponding first cable cavities and coupled to the first connector housing, each first cable assembly including a first cable and a first contact assembly coupled to an end of the first cable, the first cable having an insulator holding a first conductor and a second conductor, the first cable having a first cable shield, the first contact assembly including a first contact holder holding a first contact and a second contact, the first contact assembly including a first contact shield providing electrical shielding for the first and second contacts, the first contact shield providing 360° shielding for the first and second contacts along a length of the first and second contacts, the first contact shield electrically coupled to the first cable shield and providing 360° shielding for a length of the first cable shield;

a second cable connector assembly including a second connector housing having second cable cavities extending between a mating end and a cable end, the second cable connector assembly including a plurality of second cable assemblies received in corresponding second cable cavities and coupled to the second connector housing, each second cable assembly including a second cable and a second contact assembly coupled to an end of the second cable, the second cable having an insulator holding a third conductor and a fourth conductor, the second cable having a second cable shield, the second contact assembly including a second contact holder holding a third contact and a fourth contact, the third contact configured to be electrically connected to the first contact, the fourth contact configured to be electrically connected to the second contact, the second contact assembly including a second contact shield providing electrical shielding for the third and fourth contacts, the second contact shield providing 360° shielding for the third and fourth contacts along a length of the third and fourth contacts, the second contact shield electrically coupled to the second cable shield and providing 360° shielding for a length of the second cable shield, the second contact shield configured to be electrically connected to the first contact shield.

21. The communication system of claim 20, wherein the third contact is directly coupled to the first contact and the fourth contact is directly coupled to the second contact.

22. The communication system of claim 20, further comprising an adapter module between the first cable connector assembly and the second cable connector assembly, the adapter module including a first adapter module contact and a second adapter module contact, the first adapter module contact coupled to the first and third contacts, the second adapter module contact coupled to the second and fourth contacts, the adapter module including an adapter module shield surrounding the first and second adapter module contacts, the adapter module shield coupled to the first contact shield and the second contact shield.

* * * * *